(12) United States Patent
Shin et al.

(10) Patent No.: US 10,075,325 B2
(45) Date of Patent: Sep. 11, 2018

(54) USER TERMINAL DEVICE AND CONTENTS STREAMING METHOD USING THE SAME

(71) Applicant: Samsung Electronics Co. Ltd., Suwon-si, Gyeonggi-do (KR)

(72) Inventors: In-young Shin, Seoul (KR); Won-jong Choi, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 13/973,510

(22) Filed: Aug. 22, 2013

(65) Prior Publication Data

US 2014/0059246 A1  Feb. 27, 2014

(30) Foreign Application Priority Data

Aug. 22, 2012 (KR) .................. 10-2012-0091882

(51) Int. Cl.
*G06F 15/16* (2006.01)
*H04L 29/06* (2006.01)

(52) U.S. Cl.
CPC .... *H04L 29/06448* (2013.01); *H04L 65/4084* (2013.01); *H04L 65/602* (2013.01); *H04L 65/80* (2013.01)

(58) Field of Classification Search
CPC .............................. H04N 21/23; H04N 19/124
See application file for complete search history.

(56) References Cited

U.S. PATENT DOCUMENTS

| | | | |
|---|---|---|---|
| 2004/0153951 A1* | 8/2004 | Walker | H04L 29/06027 714/776 |
| 2005/0172028 A1* | 8/2005 | Nilsson | H04L 29/06 709/231 |
| 2006/0025069 A1 | 2/2006 | Benco et al. | |
| 2006/0171457 A1* | 8/2006 | DeGarrido | H04N 5/147 375/240.03 |
| 2007/0237090 A1 | 10/2007 | Kim et al. | |
| 2009/0019492 A1 | 1/2009 | Grasset | |
| 2009/0317064 A1 | 12/2009 | Matsubayashi | |
| 2010/0161716 A1 | 6/2010 | Kajos et al. | |
| 2011/0015395 A1 | 1/2011 | Lee et al. | |
| 2011/0029606 A1 | 2/2011 | Ozawa | |
| 2011/0225315 A1 | 9/2011 | Wexler et al. | |

(Continued)

FOREIGN PATENT DOCUMENTS

| | | |
|---|---|---|
| CN | 1668109 A | 9/2005 |
| CN | 102123303 A | 7/2011 |

(Continued)

*Primary Examiner* — Umar Cheema
*Assistant Examiner* — Anthony T Rotolo
(74) *Attorney, Agent, or Firm* — Jefferson IP Law, LLP

(57) ABSTRACT

A contents streaming method of a user terminal device is provided. The method includes converting a certain portion of contents into a first format based on information to initially display contents on the external device, transmitting the certain portion of contents converted into the first format to the external device, converting the contents into a second format different from the first format after transmitting the portion of contents converted into the first format, and transmitting the contents converted into the second format to the external device.

15 Claims, 16 Drawing Sheets

(56) References Cited

U.S. PATENT DOCUMENTS

2012/0023254 A1* 1/2012 Park .................. H04L 65/4084
709/231
2012/0141089 A1 6/2012 Hunt
2013/0275615 A1* 10/2013 Oyman .................. H04L 65/60
709/231

FOREIGN PATENT DOCUMENTS

| CN | 102265535 A | 11/2011 |
|---|---|---|
| EP | 2271098 A1 | 1/2011 |
| KR | 10-0782343 B1 | 12/2007 |
| KR | 10-2010-0053708 A | 5/2010 |
| KR | 10-2012-0076483 A | 7/2012 |

* cited by examiner

USER TERMINAL DEVICE AND CONTENTS STREAMING METHOD USING THE SAME

CROSS-REFERENCE TO RELATED APPLICATION(S)

This application claims the benefit under 35 U.S.C. § 119(a) of a Korean patent application filed on Aug. 22, 2012 in the Korean Intellectual Property Office and assigned Serial No. 10-2012-0091882, the entire disclosure of which is hereby incorporated by reference.

TECHNICAL FIELD

The present disclosure relates to a user terminal device and a contents streaming method using the same. More particularly, the present disclosure relates to a user terminal device configured to share contents with external devices and the contents streaming method using the same.

BACKGROUND

Enhancement of an electronic technology enables users to receive contents in a streaming format through user terminal devices. Meanwhile, in order to play contents in a user terminal device in real time, a certain amount of contents to be streamed should be buffered first. However, if contents capacity is too large, users may feel inconvenienced due to long buffering time.

Therefore, a need exists for a method for reducing time in buffering contents provided in a streaming format.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal device configured to convert bit rates of contents according to whether buffering completes in an external device and stream to the external device, and a contents streaming method using the same.

In accordance with an aspect of the present disclosure, a contents streaming method of a user terminal device is provided. The method includes converting a certain portion of contents into a first format based on information to initially display the contents on an external device, transmitting the certain portion of contents converted into the first format to the external device, converting the contents into a second format different from the first format after transmitting the portion of contents converted into the first format, and transmitting the contents converted into the second format to the external device.

The method may additionally include converting the certain portion of contents into the first format based on a certain duration of contents for which the external device will initially buffer and time consumed for initial buffering approved by the external device.

The converting of the certain portion of contents into the first format includes modifying at least one of a resolution, compression rates, or frame rates regarding the contents.

The converting of the certain portion of contents into the first format may include calculating bit rates corresponding to the first format based on the certain duration of contents for which the external device will initially buffer and time consumed for initial buffering approved in the external device, and converting the certain portion of contents so as to have the calculated bit rates.

The calculating of bit rates may include calculating the bit rates corresponding to the first format with the following equation: Bit rates=(buffering approving time*network bandwidth)/buffering requesting time, wherein the buffering approving time includes a certain duration of contents for which the external device will initially buffer, the buffering requesting time includes time consumed for initial buffering approved in the external device, and the network bandwidth includes a maximum transmission speed between the user terminal device and the external device.

The certain portion of contents may include a certain duration of contents used for initial buffering in the external device.

The converting of the contents into the second format includes converting a remaining portion of the contents excluding the certain portion of contents into the second format, or converting an entire portion including the certain portion of contents into the second format.

The contents converted into the second format may have higher bit rates than those of the certain portion of contents converted into the first format.

The transmitting of the contents converted into the second format may include transmitting the contents in the second format with the same bit rates as those of original contents to the external device, or transmitting the contents in the second format with lower bit rates than those of the original contents to the external device.

In accordance with another aspect of the present disclosure, a user terminal device is provided. The user terminal device includes a storage configured to store contents, a communicator configured to perform communication with an external device, an input configured to receive a user command to transmit contents to the external device, and a controller configured to control so that the certain portion of contents is converted into a first format based on information to initially display the contents on the external device and transmitted to the external device through the communicator, when the user command is inputted, and the contents is converted into a second format different from the first format and transmitted to the external device through the communicator, after the portion converted into the first format is transmitted to the external device.

The controller may be further configured to convert the certain portion of contents into the first format based on a certain duration of contents for which the external device will initially buffer and time consumed for initial buffering approved in the external device.

The controller may be further configured to convert the certain portion of contents into the first format by modifying at least one of a resolution, compression rates, or frame rates regarding the contents.

The controller may be further configured to calculate bit rates corresponding to the first format based on the certain duration of contents for which the external device will initially buffer and the time consumed for initial buffering approved in the external device, and convert the certain portion of contents so as to have the calculated bit rates.

The controller may be further configured to calculate bit rates corresponding to the first format with the following equation: Bit rates=(buffering approving time*network bandwidth)/buffering requesting time, wherein the buffering approving time includes a certain duration of contents for which the external device will initially buffer, the buffering requesting time includes time consumed for initial buffering approved in the external device, and the network bandwidth includes a maximum transmission speed between the user terminal device and the external device.

The certain portion of contents may include a certain duration of contents requested for initial buffering in the external device.

The controller may be further configured to convert a remaining portion excluding the certain portion of contents into the second format, or convert an entire portion including the certain portion of contents into the second format.

The contents converted into the second format may include higher bit rates than the certain portion of contents converted into the first format.

The controller may be further configured to control the communicator to transmit contents in the second format with the same bit rates as those of original contents to the external device, or to transmit contents in the second format with lower bit rates than those of the original contents to the external device.

According to the above various embodiments, a time-saving effect is provided and user convenience increases, since the time consumed for buffering in the external device when contents is streamed to the external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure provide a user terminal device configured to convert bit rates of contents according to whether buffering completes in an external device and stream to the external device, and a contents streaming method using the same.

Figure 1:
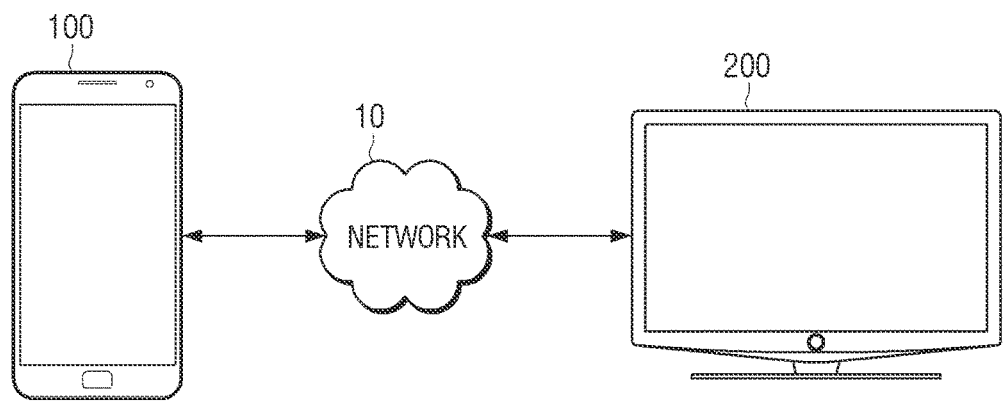
FIG. 1 illustrates a contents streaming system according to an embodiment of the present disclosure.

FIG. 1 illustrates a contents streaming system according to an embodiment of the present disclosure.

Referring to FIG. 1, a user terminal device 100 and an external device 200 may be provided in the contents streaming system according to an embodiment.

The user terminal device 100 may transmit contents to the external device 200 through a network 10. For example, the user terminal device 100 may be implemented to be a wireless terminal, such as a mobile phone like a smart phone, a tablet, and a Personal Digital Assistant (PDA), and transmit the contents stored in the user terminal device 100 in a streaming format to the external device 200.

In addition, the user terminal device 100 may convert the certain portion of contents, i.e., duration of contents which is used for initial buffering in the external device 200, to be lower bit rates and transmit the converted contents to the external device 200. When initial buffering completes in the external device 200, bit rates of the contents are reconverted and transmitted to the external device 200.

The external device 200 may connect to the user terminal device 100 through the network 10, receive and play contents from the user terminal device 100. For example, the external device 200 may be implemented as cellular phone like a smart phone, a tablet, a PDA, a Personal Computer (PC), a digital TV, and a notebook PC, and play the contents streamed by the user terminal device 100 in real time.

Meanwhile, the user terminal device 100 and the external device 200 may connect through various communication methods, such as BlueTooth (BT), WiFi, a Personal Area Network (PAN), a Local Area Network (LAN), a Wide Area Network (WAN), a Wired Input/Output (I/O), a Universal Serial Bus (USB), and the like. For example, when a user command to transmit contents is inputted from the user terminal device 100, surrounding devices may be searched through the Digital Living Network Alliance (DLNA) technology, and wireless communication may be performed by pairing when a device to be interoperated is selected among the searched devices. Additionally, pairing may be performed by using other communication methods, such as BT or WiFi, and will not be further described.

Figure 2:
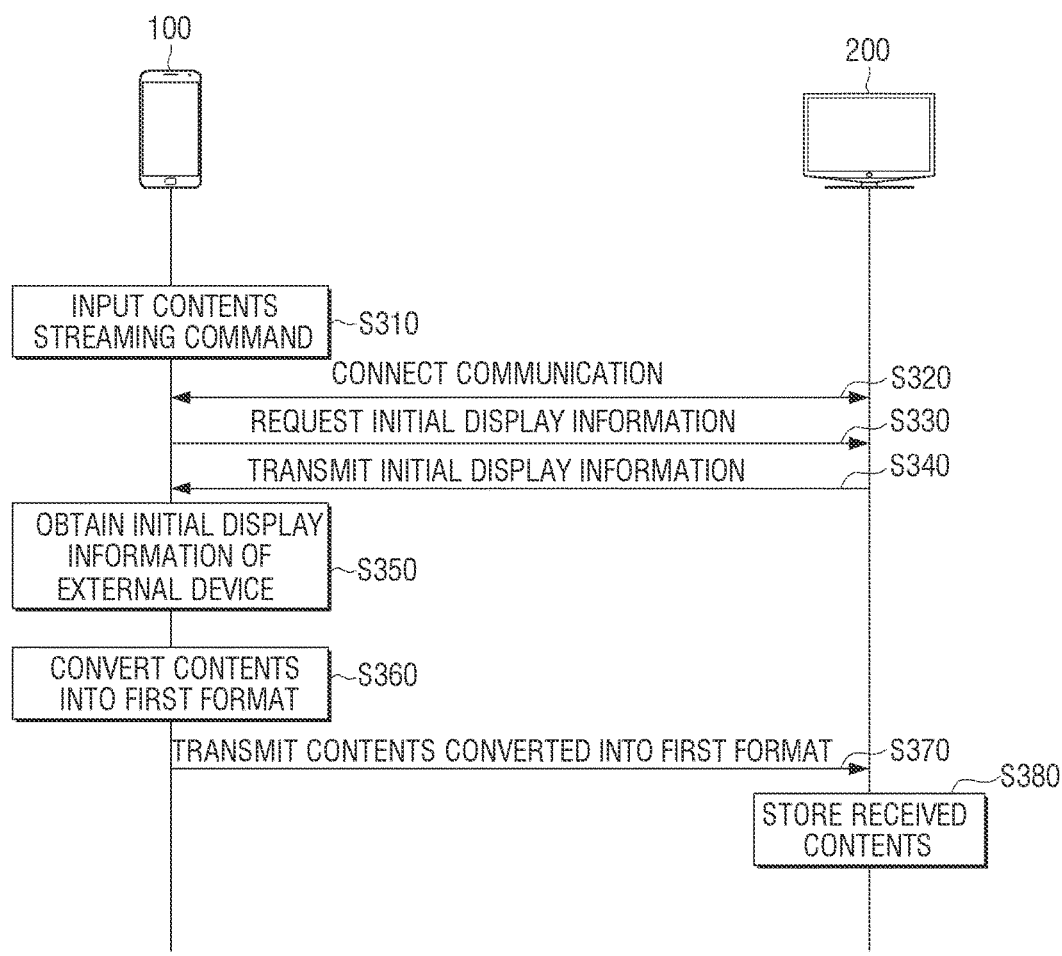
FIGS. 2 and 3 illustrate an operation of a contents streaming system according to an embodiment of the present disclosure.
Figure 3:
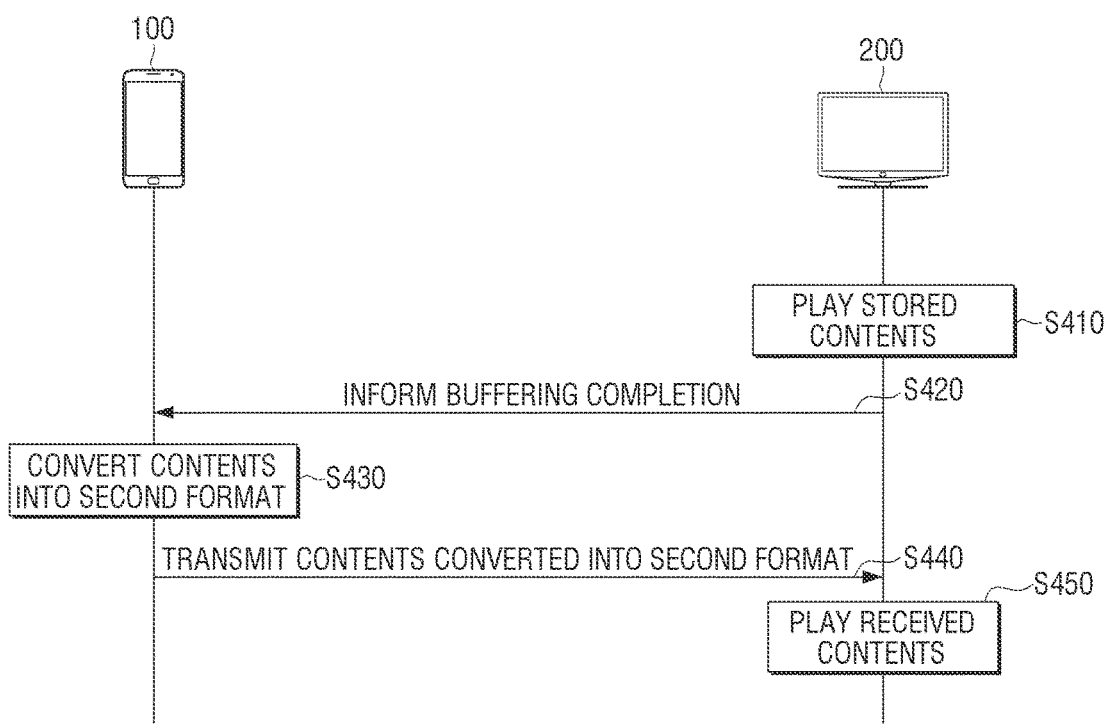

FIGS. 2 and 3 illustrate an operation of a contents streaming system according to an embodiment of the present disclosure.

First, FIG. 2 is a timing view provided to illustrate an operation of each device before buffering completes in the external device 200.

Referring to FIG. 2, the user terminal device 100 performs connecting communication with the external device 200 when a command to transmit contents is inputted in the user terminal device 100 at operation S310. In addition, the user terminal device 100 may perform searching for surrounding external devices that can wirelessly communicate and connecting wireless communication through pairing with the searched external device.

Meanwhile, the operation of receiving a contents transmitting command at operation S310 and the operation of performing connecting communication with the external device 200 at operation S320 may be performed in a different order, and the user terminal device 100 may perform connecting communication with the external device 200 based on another user command rather than the contents transmitting command.

At operation S350, the user terminal device 100 may obtain information so as to initially display contents on the external device 200.

For example, the user terminal device 100 may request transmission of initial display information to the external device 200 at operation S330, and receive initial display information from the external device 200 at operation S340. In another example, the user terminal device 100 may store initial display information in advance per external device. The user terminal device 100 may display a list regarding external devices, and obtain initial display information matched with the selected external device on the list. In this case, operations S330 and S340 may be omitted.

Meanwhile, initial display information of the external device 200 may include a certain duration of contents that the external device 200 will initially buffer and time consumed for initial buffering approved in the external device 200.

Therefore, the user terminal device 100 may convert the certain portion of contents to a first format based on the obtained initial display information at operation S360. Herein, the certain portion of contents may be a certain duration of the contents that the external device 200 will initially buffer.

In addition, the user terminal device 100 may convert bit rates regarding the certain portion of contents so that certain duration of the contents that the external device 200 will buffer can be transmitted for time consumed for buffering approved in the external device 200 through network bandwidth connected to the external device 200.

At operation S370, the user terminal device 100 transmits the certain portion of the converted contents in the first format to the external device 200. At operation S380, the external device 200 receives and stores the contents. Thus, the external device 200 performs an initial buffering operation that stores certain duration of contents so as to play the contents to be streamed in real time.

The following will describe an operation of each device after buffering completes in the external device 200 by referring to FIG. 3.

Referring to FIG. 3, the external device 200 performs processing signals regarding the buffered contents and playing stored contents at operation S410 when a certain duration of contents is stored and initial buffering completes. Thus, the external device 200 transmits a buffering completion message to the user terminal device 100 at operation S420.

Meanwhile, the user terminal device 100 may convert contents into a second format when the buffering completion message is received at operation S430, and transmit contents converted into the second format to the external device 200 at operation S440. However, when it is determined that the initial buffering operation completes in the external device 200 without receiving the buffering completion message from the user terminal device 200, the user terminal device 100 may convert contents to the second format and transmit contents converted into the second format to the external device 200. In this case, operation S420 may be omitted.

When the initial buffering operation completes in the external device 200, the user terminal device 100 may convert bit rates of the contents so as to correspond to play operation processability of the external device 200 and stream to the external device 200.

In addition, the user terminal device 100 determines whether the external device 200 can play original contents based on play operation processability of the external device 200. As a result, the user terminal device 100 streams original contents to the external device 200 when it is determined that original contents can be played in the external device 200. However, if original contents cannot be played in the external device 200, the user terminal device 100 may convert bit rates of the contents so as to include lower bit rates than those of original contents and stream to the external device 200.

Meanwhile, the user terminal device 100 may obtain information regarding play operation processability of the external device 200 through various methods.

Figure 4:
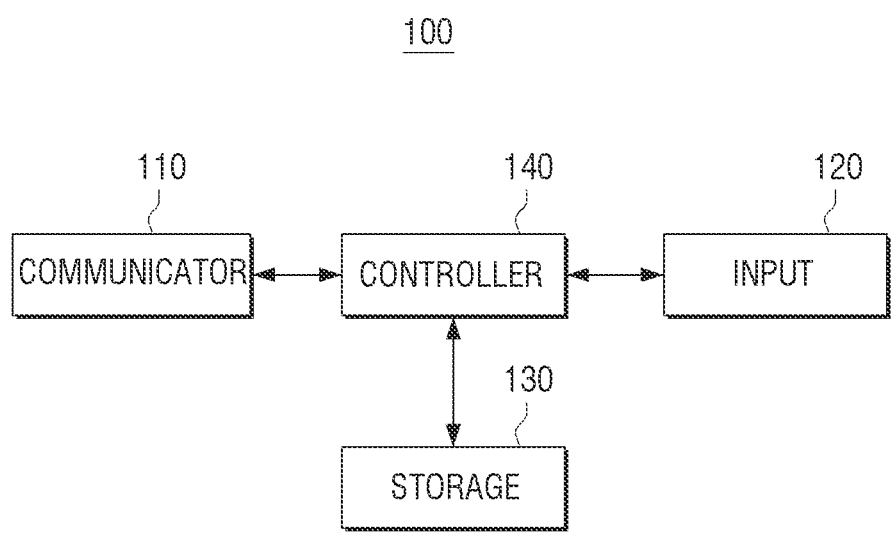
FIG. 4 is a block diagram illustrating a constitution of a user terminal device according to an embodiment of the present disclosure.

Although not illustrated in FIG. 4, the user terminal device 100 may request information regarding play operation processability to the external device 200 and receive the information regarding play operation processability from the external device 200. In this case, when the external device 200 receives a request for initial display information from the user terminal device 100, the external device 200 may transmit information regarding play operation processability with initial display information to the user terminal device 100.

In another example, the user terminal device 100 may store information regarding play operation processability of each external device in advance. Thus, the user terminal device 100 may display a list regarding external devices, and obtain play operation processability matched with the selected external device on the list.

Meanwhile, the external device 200 plays contents received from the user terminal device 100 at operation S450. In addition, the external device 200 may buffer contents which is streamed from the user terminal device 100 while playing the initially buffered contents, and play contents in real time by processing signals regarding the streamed and buffered contents after playing the initially buffered contents completes.

Therefore, according to an embodiment, the user terminal device 100 converts contents into lower bit rates and transmits to the external device 200 before initial buffering for playing contents completes. The user terminal device 100 converts bit rates of the contents so as to correspond to play operation processability of the external device 200 and transmits to the external device 200 when initial buffering of the external device 200 completes. Therefore, users can be provided with contents in real time while minimizing time consumed for buffering in the external device 200.

FIG. 4 is a block diagram illustrating a constitution of a user terminal device according to an embodiment of the present disclosure.

Referring to FIG. 4, the user terminal device 100 includes a communicator 110, an input (or, inputter) 120, a storage 130, and a controller 140.

The communicator 110 performs communication with the external device 200 of FIG. 1. Thus, the communicator 110 may perform communication with various types of external devices according to various types of communication methods.

The communicator 110 may include various types of communication modules, such as a nearfield wireless communication module (not illustrated) and a wireless communication module (not illustrated). Herein, the nearfield wireless communication module performs communication with the external device 200 which places within near distance according to nearfield wireless communication methods, such as BT and ZigBee. Further, the wireless communication module performs communication with the external device 200 connected with an external network according to wireless communication protocols, such as WiFi and the Institute of Electrical and Electronics Engineers (IEEE). Further, the wireless communication module may be provided with mobile communication module which performs communication with the external device 200 by connecting to a mobile communication network according to various mobile communication standards, such as $3^{rd}$ Generation (3G), $3^{rd}$ Generation Partnership Project (3GPP), and Long Term Evolution (LTE).

The communicator 110 may receive various information from the external device 200 by performing communication with the external device 200.

In addition, the communicator 110 may receive information to initially display contents in the external device 200. Herein, initial display information includes a certain duration of the contents that the external device 200 will initially buffer and time consumed for initial buffering approved in the external device 200.

In other words, initial display information indicates information related with initial buffering performed in the external device 200 so as to play contents in real time. The external device 200 also buffers certain duration of contents for certain time to play the contents to be streamed from the user terminal device 100 in real time and starts playing the contents when buffering regarding certain duration of contents completes. Therefore, the user terminal device 100 may control performing the initial buffering operation more efficiently in the external device 200 by using initial display information of the external device 200 received through the communicator 110.

Further, the communicator 110 may receive information regarding play operation processability of the external device 200. Herein, information regarding play operation processability may include at least one among resolution of contents that can be processed in the external device 200, decoder performance, and codec type provided in the external device 200. Furthermore, play operation processability may include a network fee for transmitting data from the user terminal device 100 to the external device 200.

The input 120 is an inputting means to receive various user manipulation and deliver to the controller 140, and can be implemented as an inputting panel. Herein, the inputting panel may be implemented as a touch pad, a keypad provided with various function keys, number keys, special keys or character keys, a touch screen, or the like.

In addition, the input 120 receives a user command to transmit contents to the external device 200. Furthermore, the input 120 may receive a user command to select an external device that can perform communication with the user terminal device 100.

For example, if the input 120 is implemented as a touch screen with a display (not illustrated), the input 120 may receive inputting an external device to perform communication by displaying a list regarding surrounding external devices that can perform a wireless communication, and receive contents to be transmitted to an external device by displaying a list regarding contents stored in the user terminal device 100 in advance.

The storage 130 is a storing medium where various programs used for operating the user terminal device 100 are stored, and can be implemented as a memory or a Hard Disk Drive (HDD). For example, the storage 130 may include a Read Only Memory (ROM) that stores programs for performing an operation of the controller 140 and a Random Access Memory (RAM) that temporarily stores data according to the performing operation of the controller 140. Further, it may include an Electrically Erasable and Programmable ROM (EEPROM) to store various reference data.

Moreover, the storage 130 may store various video contents, such as broadcasting contents, Internet contents, Video on Demand (VoD) contents, and the like.

The controller 140 controls a general operation of the user terminal device 100. Specifically, the controller 140 may control the communicator 110 to search for surrounding external devices that can perform a wireless communication, and perform communication with the selected external device by a user.

Further, when a command to transmit contents is inputted, the controller 140 may convert the certain portion of contents into the first format based on information to initially display contents in the external device 200 and transmit the converted portion of contents to the external device 200 through the communicator 110. Herein, initial display information is initial buffering performance of the external device requested to play content and it may be received from the external device 200 or stored in the user terminal device 100 in advance.

For example, the user terminal device 100 may match initial display information per external device and store them in advance. Meanwhile, the controller 140 may request transmission of initial display information through the communicator 110 to the external device 200 and receive initial display information from the external device 200.

The external device 200 buffers certain duration of contents to play contents to be streamed by the user terminal device 100 in real time. At this moment, certain duration of contents that the external device 200 will initially buffer and time consumed for initial buffering approved in the external device may be predefined per device, and expressed on a second or minute basis.

Meanwhile, the external device 200 completes initial buffering operation when a certain duration of contents to be initially buffered is received, and plays the buffered contents. Therefore, as contents capacity is larger, it takes more time for streaming duration of contents requested for initial buffering with the external device 200, and the external device 200 takes too much time to perform initial buffering operation.

Therefore, according to the present disclosure, the user terminal device 100 makes bit rates of contents lower and transmits until initial buffering of the external device 200 completes so as to reduce time consumed for initial buffering of the external device 200.

In addition, the controller 140 converts the certain portion of contents into the first format based on a certain duration of contents that the external device 200 will initially buffer and time consumed for initial buffering approved in the external device. Herein, the certain portion of contents may include a certain duration of contents requested for initial buffering operation in the external device 200.

Thus, the controller 140 may calculate bit rates corresponding to the first format based on a certain duration of contents that the external device 200 will initially buffer and time consumed for initial buffering approved by the external device, and convert the certain portion of contents to have the calculated bit rates.

Moreover, the controller 140 may calculate bit rates corresponding to the first format by using Equation (1):

$$\text{Bit rates} = (\text{buffering approving time} * \text{network bandwidth}) / \text{buffering requesting time} \quad \text{Equation (1)}$$

Herein, buffering approving time is a certain duration of contents that the external device 200 will initially buffer, buffering requesting time is time consumed for initial buffering approved in the external device 200, and network bandwidth is maximum transmission speed between the user terminal device 100 and the external device 200.

Thus, the controller 140 calculates maximum bit rates of contents that can satisfy buffering performance of the external device 200 through network bandwidth connecting the user terminal device 100 and the external device 200. Furthermore, the controller 140 may calculate bit rates of contents so that certain duration of contents that the external device 200 will initially buffer can be transmitted within time consumed for initial buffering approved in the external device 200 through network bandwidth.

Meanwhile, the controller 140 may convert the certain portion of contents into the first format by modifying at least one of a resolution, compression rates, or frame rates regarding contents.

Thus, the controller 140 determines whether to convert and transmit contents to the external device 200 by comparing the calculated bit rates and original bit rates of contents. Specifically, the controller 140 controls the communicator 110 to stream original contents to the external device 200 without modifying bit rates, when the calculated bit rates are greater than original bit rates of contents.

However, when the calculated bit rates are smaller than original bit rates of contents, the controller 140 controls the communicator 110 to encode contents so as to have the calculated bit rates and stream to the external device 200. At this moment, the controller 140 controls the communicator 110 to reduce bit rates of contents so as to have the calculated bit rates by modifying at least one of a resolution, compression rates, or frame rates regarding contents, and transmit the contents having the reduced bit rates to the external device.

The controller 140 may scale down contents so as to have resolution corresponding to the calculated bit rates, and generate low-quality of contents in which bit rates are reduced compared to original contents.

In this case, the controller 140 may generate low-quality of contents by considering resolution of contents that can be processed in the external device 200.

Specifically, the controller 140 scales down contents into corresponding resolution to the calculated bit rates, when resolution corresponding to the calculated bit rates is lower than resolution of contents that can be processed in the external device 200.

However, when resolution of contents that can be processed in the external device 200 is lower than resolution corresponding to the calculated bit rates, the controller 140 scales down contents into resolution of contents that can be processed in the external device 200. Through this downscaling, the external device 200 may immediately play contents which is streamed in the user terminal device 100 without additional scaling while satisfying initial buffering operation of the external device 200.

Further, the controller 140 may generate low-quality of contents in which bit rates are reduced rather than those of original contents by increasing compression rates and re-encoding contents so as to have compression rates corresponding to the calculated bit rates. Furthermore, the controller 140 may generate low-quality of contents in which bit rates are reduced rather than those of original contents by decreasing frame rates and re-encoding contents so as to have frame rates corresponding to the calculated bit rates.

Meanwhile, the controller 140 may control the communicator 110 to transmit additional information regarding contents when contents is transmitted to the external device 200. Herein, additional information regarding contents may include title, cast, and plot.

Meanwhile, the controller 140 controls the communicator 110 to convert contents into the second format different from the first format and transmit the converted contents to the external device 200 after transmitting the portion which was converted into the first format to the external device 200. Thus, the controller 140 may control re-converting bit rates of the contents and transmitting the converted content to the external device 200 when all the certain duration of contents that is requested for initial buffering in the external device 200 is transmitted to the external device 200.

For the above process, the controller 140 may determine that buffering completes in the external device when every contents capacity used for initial buffering in the external device is transmitted. Thus, when all the duration of contents that the external device will buffer is streamed to the external device, the controller 140 may determine that initial buffering completes in the external device. Meanwhile, the controller 140 may determine that buffering completes in the external device 200 when a buffering completion message is received from the external device 200.

Herein, the contents converted into the second format may include higher bit rates than the certain portion of contents converted into the first format. When initial buffering operation completes in the external device 200, the controller 140 converts contents into higher bit rates than those of the contents which was transmitted for initial buffering and streams to the external device 200.

Meanwhile, the external device 200 may buffer contents received thereafter for a time when the contents to be initially buffered is played, signal-process and play the contents to be buffered thereafter when playing the contents to be initially buffered completes. Therefore, even if the user terminal device 100 streams the contents converted into relatively higher bit rates to the external device 200 after initial buffering completes, the external device 200 may play the contents in real time.

Specifically, when the controller 140 determines that the contents used for initial buffering is transmitted from the external device 200, the controller 140 may stop transmitting contents in the first format, convert the contents into the second format, and transmit the converted contents to the external device 200.

In this case, the controller 140 may control the communicator 110 to transmit contents in the second format including the same bit rates as original contents to the external device 200, or transmit contents in the second format including lower bit rates than original contents to the external device 200. Herein, the reason why the controller 140 converts contents to include lower bit rates than original bit rates of contents is due to play operation processability of the external device 200.

Play operation processability indicates capability to signal-process and play contents in the external device 200. Play operation processability may include at least one of a resolution that can be processed in the external device 200, decoder performance, or codec type which are provided by the external device 200. Furthermore, play operation processability may include a network fee for transmitting data from the user terminal device 100 to the external device 200.

Such play operation processability may be stored in the user terminal device 100 in advance or received from the external device 200. For example, the user terminal device 100 may match play operation processability of each device and store them in advance. Meanwhile, the user terminal device 100 may receive play operation processability from the external device 200. The controller 140 may request transmission of play operation processability to the external device 200 through the communicator 110, and receive play operation processability from the external device 200. When requesting transmission of initial display information to the external device 200, the controller 140 may also request transmission of play operation processability.

In addition, the controller 140 determines whether the external device 200 signal-processes and plays original contents according to resolution that can be processed in the external device 200, decoder performance, and codec type.

In this case, when it is determined that the external device 200 can perform signal-processing and playing original contents, the controller 140 may stream original contents to the external device 200.

However, if the external device 200 cannot perform signal-processing regarding original contents, the controller 140 may convert the contents into lower bit rates than original contents and stream to the external device 200. For example, the controller 140 may re-encode contents to include bit rates that can be signal-processed in the external device 200 according to resolution that can be processed in the external device 200, decoder performance or codec type which is provided on the external device, convert contents into lower bit rates than original contents, and stream the converted contents to the external device 200.

Further, if the cost exceeds a certain fee when the user terminal device 100 transmits contents with original bit rates, the controller 140 may convert contents into lower bit rates than those of original contents, and stream to the external device 200.

However, in the above embodiment, bit rates of the contents which is converted by considering play operation processability may be higher than bit rates of the contents which are streamed for initial buffering.

Meanwhile, the controller 140 may convert a remaining portion excluding the certain portion of contents into the second format, or an entire portion including the certain portion of contents into the second format. Thus, when initial buffering operation completes in the external device 200, the controller 140 may stream to the external device 200 by converting the remaining portion after duration of contents which is transmitted for initial buffering into the second format, or stream to the external device 200 by converting the entire portion from the start into the second format.

Meanwhile, the above embodiment describes that, when initial buffering completes in the external device 200, bit rates are re-converted, and higher-quality of contents than the contents transmitted for initial buffering is transmitted to the external device 200. However, this is merely one embodiment and in the user terminal device 100, time point when transmitting high-quality of contents may be modified in various forms.

For example, even before initial buffering completes in the external device 200, the controller 140 may stop streaming contents converted into low bit rates, and stream contents converted into relatively higher bit rates to the external device 200 upon request from the external device 200.

Meanwhile, even when initial display information of the external device 200 is modified or network situation is modified, the controller 140 may stop streaming contents converted into low bit rates. Specifically, when duration of contents that the external device 200 will buffer decreases or network bandwidth between the user terminal device 100 and the external device 200 expands while streaming contents converted into low bit rates for initial buffering of the external device 200, the controller 140 may stop streaming contents converted into low bit rates and stream contents converted into relatively higher bit rates to the external device 200.

In summary, according to the embodiment, the user terminal device 100 streams contents converted into low bit rates to the external device 200 until initial buffering completes in the external device. Therefore, it may reduce time consumed for initial buffering which is performed when the external device 200 plays contents.

Figure 5:
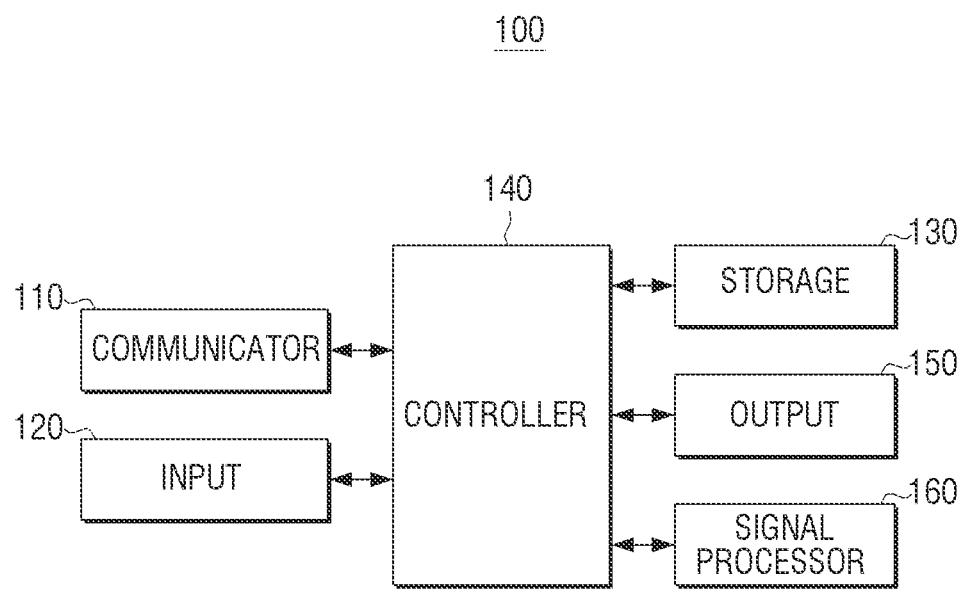
FIG. 5 is a block diagram illustrating a constitution of a user terminal device according to an embodiment of the present disclosure.

FIG. 5 is a block diagram illustrating a constitution of a user terminal device according to an embodiment of the present disclosure.

Referring to FIG. 5, the user terminal device 100 may further include a signal processor 160, an output (or, outputter) 150, and a storage 130 as well as the units illustrated in FIG. 4. Because the units of FIG. 5 overlapped with those of FIG. 4 have the same functions, they will not be described below.

The signal processor 160 performs signal-processing regarding contents so that contents can be outputted through the output 150. Specifically, the signal processor 160 may convert video signals in a format that can be outputted in the output 150 by performing an operation, such as decoding, scaling, frame rate converting, and encoding, regarding video signals included in contents. Further, the signal processor 160 may convert audio signals in a format that can be outputted in the output 150 by performing signal-processing, such as decoding regarding audio signals included in contents.

The output 150 performs outputting function of contents. For the outputting, the output 150 may include a display (not illustrated) and a speaker (not illustrated).

The display may display video signals as video. For the displaying, the display may be implemented as a Liquid Crystal Display (LCD), an Organic Light Emitting Diode (OLED), a Plasma Display Panel (PDP), or the like.

Further, the display may provide various display screens that can be provided through the user terminal device 100. Specifically, the display may display various UI screens which include a list of external devices that can perform a wireless communication with the user terminal device 100, a list of contents stored in the user terminal device 100 in advance, and objects (e.g., an icon) that can receive a contents transmitting command.

Herein, the display may be implemented as a touch screen that forms interlayer structure with the touch pad, and the touch screen may be constituted so as to detect position, size, and pressure of touch inputting.

Meanwhile, the speaker (not illustrated) may process audio signals and output the processed signals as audio. Specifically, the speaker (not illustrated) may amplify audio signals delivered from the signal processor 160 and provide the amplified audio signals to a user.

Although the above embodiment describes that audio is inputted through the speaker (not illustrated), an outputting port, such as a jack, may be also provided. Meanwhile, the display (not illustrated) and the speaker (not illustrated) may synchronize and output audio signals and video signals that constitute contents according to controlling of the controller 140.

Meanwhile, the controller 140 may control signal-processing and playing the selected contents when a contents playing command is inputted through the input 120. When a contents transmitting command is inputted while playing the contents, the controller 140 may control stopping playing the contents, and streaming a portion that will be played thereafter to the external device 200. Thus, the controller 140 may control playing the contents which was played in the user terminal device 100 in the external device 200 seamlessly. However, the controller 140 may control streaming a portion that will be played thereafter to the external device 200 without stopping playing contents, and streaming an entire portion from the start to the external device 200.

In this case, the controller 140 may stream to the external device 200 by converting bit rates of contents based on initial display information of the external device 200.

The storage 130 is a storing medium where various programs used for operating the user terminal device 100 are stored, and can be implemented as a memory or an HDD. For example, the storage 130 may include a ROM that stores programs for performing an operation of the controller 140 and a RAM that temporarily stores data according to the performing operation of the controller 140. Further, it may include an EEPROM to store various reference data.

Specifically, the storage 130 may store information to initially display contents in the external device 200. Moreover, the storage 130 may store device names regarding external devices and store initial display information by matching the information per device name. Further, when initial display information is received from a new external device, the storage 130 may add and store the received information with previous initial display information per device.

Furthermore, the storage 130 may store information regarding play operation processability of the external device 200. Specifically, the storage 130 may store device names regarding external devices and store play operation processability of each device name by matching the information with each device. Further, when information regarding play operation processability is received from a new external device, the storage 130 may add and store the received information with previous information regarding play operation processability of each device.

Therefore, when an external device to perform a wireless communication is selected from the list displayed on the display, the controller 140 may read initial display information and play operation processability matched with the selected external device from the storage 130, and convert bit rates of contents by using the read information.

Figure 6:
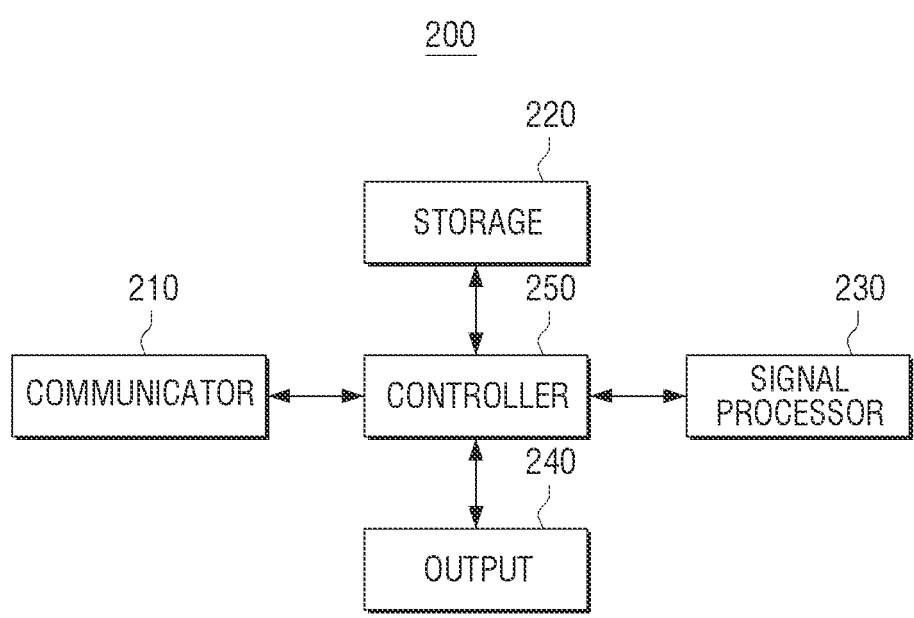
FIG. 6 is a block diagram illustrating a constitution of an external device according to an embodiment of the present disclosure.

FIG. 6 is a block diagram illustrating a constitution of an external device according to an embodiment of the present disclosure.

Referring to FIG. 6, the external device 200 includes a communicator 210, a storage 220, a signal processor 230, an output (or, outputter) 240, and a controller 250.

The communicator 210 may receive contents in a streaming format which the user terminal device 100 transmits by performing communication with the user terminal device 100 of FIG. 1. For the above process, the communicator 210 may include various communication modules, such as a nearfield wireless communication module (not illustrated) and a wireless communication module (not illustrated). Herein, the nearfield wireless communication module performs communication with external devices placed within near distance according to nearfield wireless communication methods, such as BT or ZigBee. Further, the wireless communication module performs communication by connecting to an external network according to wireless communication protocols, such as WiFi or IEEE. Further, the wireless communication module may include a mobile communication module which performs communication by connecting to a mobile communication network according to various mobile communication standards, such as 3G, 3GPP, and LTE.

The storage 220 is a storing medium where various programs used for operating the user terminal device 100 are stored, and can be implemented as a memory or an HDD. For example, the storage 220 may include a ROM that stores programs for performing an operation of the controller 250 and a RAM that temporarily stores data according to the performing operation of the controller 250. Further, it may include an EEPROM to store various reference data.

Specifically, the storage 220 stores contents so as to play contents to be streamed from the user terminal device 100 in real time. Thus, the storage 220 may perform a function buffering contents.

The signal processor 230 performs signal-processing regarding contents so that contents can be outputted through the output 240. Specifically, the signal processor 230 may convert the video signals to be formatted to be outputted in the output 240 by performing decoding, scaling, frame rate converting, and encoding regarding video signals included in contents. Further, the signal processor 230 may convert the audio signals to be formatted to be outputted in the output 240 by performing signal-processing, such as decoding, regarding audio signals included in contents.

The output 240 performs a function of outputting contents. For this operation, the output 240 may include the display (not illustrated) and the speaker (not illustrated).

Specifically, the display may process video signals and display them as video. For this operation, the display may be implemented as an LCD, an OLED, or a PDP.

Meanwhile, the speaker may process audio signals and output them as audio. Specifically, the speaker may amplify the audio signals delivered form the signal processor 240 and provide the amplified audio signals to a user. Although the above describes that audio is outputted through the speaker, an outputting port, such as a jack, may be further provided. Meanwhile, the display and the speaker may synchronize audio signals and video signals which constitute contents and output them according to controlling of the controller 250.

The controller 250 controls a general operation of each unit regarding the external device 200. Each unit included in the external device 200 is already described above and will not be described below.

Specifically, the controller 250 may control the communicator 210 to transmit information to initially display contents and information regarding play operation processability according to a request of the user terminal device 100.

Further, the controller 250 controls each unit to play contents which is streamed in the user terminal device 100 in real time.

Specifically, the controller 250 may store contents streamed in the user terminal device 100 in the storage 220, and perform signal-processing and playing regarding the initially buffered contents through the signal processor 230 when a certain duration of contents is stored and initial buffering operation completes. Herein, contents which is streamed before initial buffering completes may be contents converted into bit rates corresponding to initial display information.

Thus, because contents converted into relatively lower bit rates is received before initial buffering completes, the controller 250 may perform decoding the buffered contents by converting playing mode of a decoder (not illustrated) included in the signal processor 230 to a low-quality playing mode.

Meanwhile, the controller 250 may output additional information regarding contents through the output 240 when playing contents converted into low bit rates. When contents having lower resolution than that of contents that can be played in the external device 200 is received from the user terminal device 100, the controller 250 may display the contents including lower resolution on one area of the screen provided on the display, and additional information regarding contents on another area of the screen. Herein additional information of contents may include title, cast, and plot.

When initial buffering completes, the controller 250 may transmit a buffering completion message to the user terminal device 100 through the communicator 210. While the initially buffered contents is playing, the controller 250 may buffer contents to be streamed. When playing the initially buffered contents completes, the controller 250 may perform signal-processing regarding contents buffered thereafter, and play contents in real time.

Meanwhile, because contents converted into relatively higher bit rates is received when initial buffering completes compared to before initial buffering completes, the controller 250 may perform decoding regarding the buffered contents by converting a playing mode of the decoder provided on the signal processor 230 into a high-quality playing mode.

Figure 7:
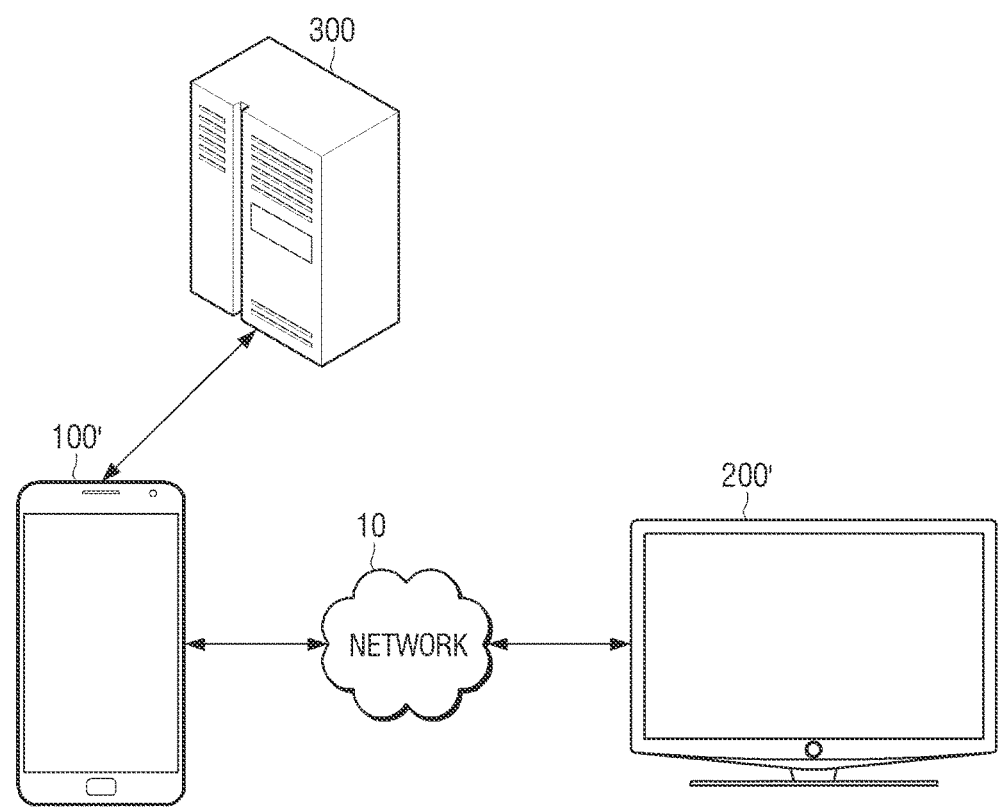
FIG. 7 illustrates a contents streaming system according to an embodiment of the present disclosure.

FIG. 7 illustrates a contents streaming system according to an embodiment of the present disclosure.

Referring to FIG. 7, the contents streaming system may include a user terminal device 100', an external device 200', and a server 300. Meanwhile, the contents streaming system of FIG. 7 has a difference in that contents is stored in the server 300 and the user terminal device 100' plays a role of transmitting contents streamed by the server 300 to the external device 200' compared to FIG. 1. Therefore, units and functions overlapped with FIG. 1 will not be described below.

The server 300 may transmit stored contents to the external device 200' through the user terminal device 100'.

Specifically, the server 300 may convert bit rates of the contents which is streamed to the user terminal device 100' based on information to initially display contents in the external device 200', and stream the contents in which bit rates are converted to the user terminal device 100'. Further, the server 300 may re-convert bit rates of the contents which is streamed to the user terminal device 100' and stream to the user terminal device 100', when initial buffering operation completes in the external device 200'.

Herein, the server 300 may be implemented as various web servers which store various contents and provide contents in a streaming format to various devices. However, this is merely one embodiment and the server 300 may be implemented as a micro server, and included in the user terminal device 100'.

The user terminal device 100' not only plays contents which is streamed from the server 300 but also transmits the contents to the external device 200'. The user terminal device 100 may be implemented as a wireless terminal, such as a cellular phone, a tablet and a PDA, play contents which is streamed from the server 300, and transmit contents which is streamed from the server 300 to the external device 200' according to a user command. Thus, the user terminal device 100' may play a role of airing between the external device 200' and the server 300.

Figure 8:
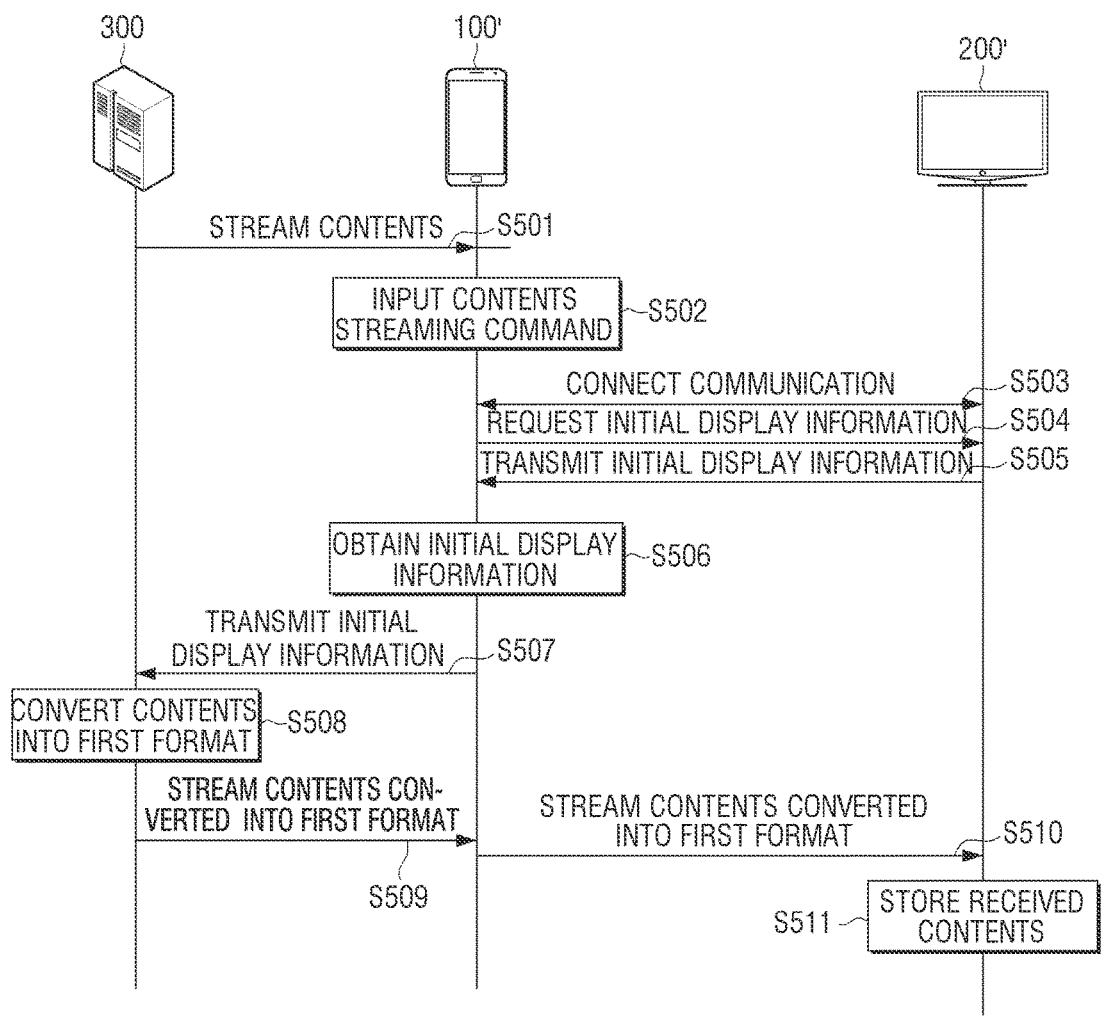
FIGS. 8 and 9 illustrate an operation of a contents streaming system according to an embodiment of the present disclosure.
Figure 9:
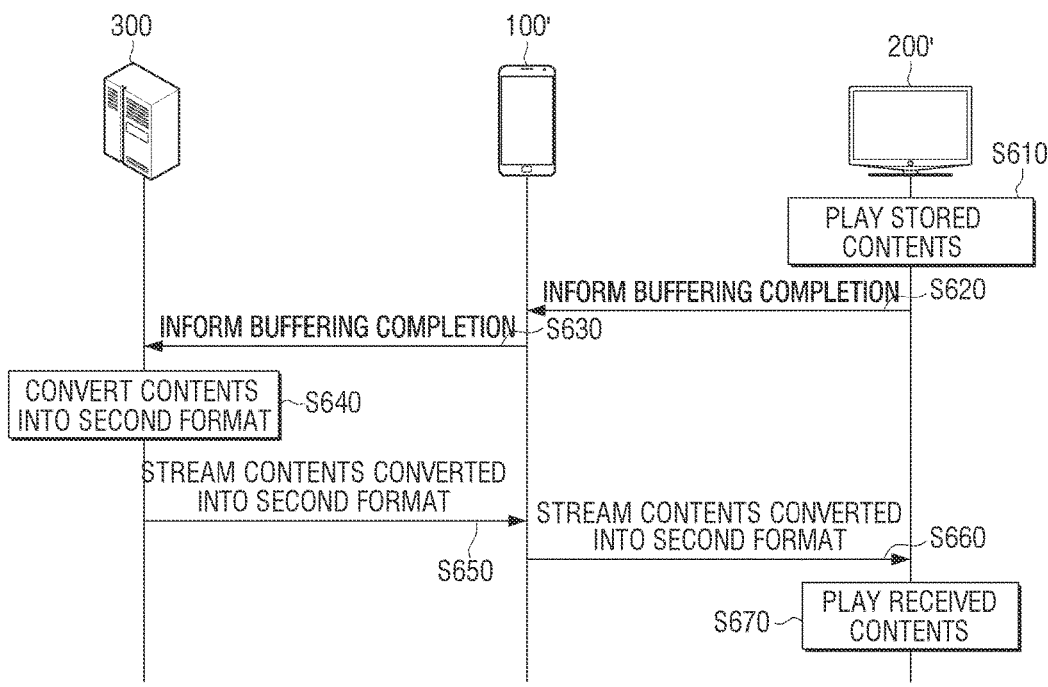

FIGS. 8 and 9 illustrate an operation of a contents streaming system according to an embodiment of the present disclosure.

First, FIG. 8 is a timing view illustrating an operation of each unit before initial buffering completes in the external device 200'.

Referring to FIG. 8, the server transmits contents to the user terminal device 100' at operation S501. Specifically, the server 300 streams contents to the user terminal device 100' and the user terminal device 100' plays contents which is streamed from the server 300 in real time.

If a contents streaming command is inputted at operation S502, the user terminal device 100' performs a connecting communication with the external device 200'. Specifically, the user terminal device 100' may search for surrounding external devices that can perform a wireless communication and perform a connecting communication with the searched external device through a pairing process with the device.

Meanwhile, order of operation S502 of receiving a contents streaming command and operation S503 of performing connecting communication with the external device 200' may change, and the user terminal device 100' may perform connecting communication with the external device 200' based on another user command rather than a contents streaming command.

The user terminal device 100' obtains information to initially display contents in the external device 200' at operation S506.

For example, the user terminal device 100' may request transmission of initial display information to the external device 200' at operation S504 and receive initial display information from the external device 200' at operation S505. In another example, the user terminal device 100' may store initial display information per external device in advance. Thus, the user terminal device 100' may display a list regarding external devices, and obtain initial display information matched with external devices. In this case, operations S504 and S505 may be omitted.

Meanwhile, initial display information is initial buffering performance of the external device 200', and includes a certain duration of contents that the external device 200' will initially buffer and time consumed for initial buffering approved in the external device 200'. Because the above is described with FIGS. 1 to 6, specific overlapping explanation is omitted.

The user terminal device 100' may transmit the obtained initial display information to the server 300 at operation S507. In this case, the user terminal device 100' may transmit information regarding network situation between the user terminal device 100' and the external device 200'. Herein, network situation includes network bandwidth which is provided by communication between the user terminal device 100' and the external device 200'.

Meanwhile, the server 300 may convert contents into the first format based on the obtained initial display information at operation S508. Specifically, the server 300 may convert bit rates of contents so as to transmit a certain duration of contents that the external device 200' will initially buffer during time consumed for initial buffering approved in the external device 200' through network bandwidth between the user terminal device 100' and the external device 200'.

At operation S509, the server 300 transmits the contents converted into the first format to the user terminal device 100'. The user terminal device 100' transmits the received contents in the first format to the external device 200' at operation S510. Thus, the user terminal device 100' performs a role of airing between the user terminal device 100' and the external device 200'.

Meanwhile, the external device 200' receives and stores contents at operation S511. The external device 200' performs initial buffering operation which stores certain duration of contents so as to play contents which is streamed from the user terminal device 100' in real time.

The following will illustrate an operation of each unit after initial buffering completes in the external device 200' by referring to FIG. 9.

Referring to FIG. 9, when a certain duration of contents is stored and initial buffering completes, the external device 200' performs signal-processing regarding the buffered contents and playing stored contents at operation S610. The external device 200' transmits a buffering completion message to the user terminal device 100' at operation S620, and the user terminal device 100' transmits the received buffering completion message to the server at operation S630.

Meanwhile, when the buffering completion message is received, the server 300 converts contents into the second format at operation S640, and transmits the converted contents to the user terminal device 100' at operation S650. Furthermore, when it is determined that every contents capacity which the external device 200' will initially buffer is streamed to the user terminal device 100', the server 300 may convert contents into the second format and transmit the converted contents to the user terminal device 100'.

In this case, the server 300 may convert bit rates of contents and stream the converted contents to the user terminal device 100' so as to correspond to play operation processability of the external device 200'.

Specifically, the server 300 may stream original contents to the user terminal device 100', when original contents can be played by the external device 200', or convert original contents into lower bit rates and stream to the user terminal device 100', when original contents cannot be played by the external device 200'.

Further, the server 300 may convert bit rates of contents by considering a network fee for transmitting data between the user terminal device 100' and the external device 200'. Thus, if the cost exceeds a certain fee when original contents is streamed from the user terminal device 100' to the external device 200', the server 300 may convert original contents into lower bit rates and stream to the user terminal device 100'.

Meanwhile, the server 300 may obtain information regarding play operation processability of the external device 200' through various methods.

Although not illustrated in FIG. 9, when the server 300 requests transmitting information regarding play operation processability to the user terminal device 100', the user terminal device 100' may deliver relevant information to the external device 200'. Accordingly, the user terminal device 100' may receive information regarding play operation processability and deliver the information to the server 300. In this case, the user terminal device 100' may also request transmitting information regarding play operation processability when requesting transmitting initial display information, receive information regarding play operation processability from the external device 200', and transmit the information to the server 300.

In another example, the server 300 may store information regarding play operation processability of each external device in advance.

Meanwhile, the user terminal device 100' transmits the received contents in the second format to the external device 200' at operation S660.

The external device 200' plays the received contents from the user terminal device 100' at operation S670. Specifically, the external device 200' buffers contents which is streamed while the initially buffered contents plays, and performs signal-processing and playing the buffered contents after playing the initially buffered contents completes. Therefore, the external device 200' may play contents in real time.

Figure 10:
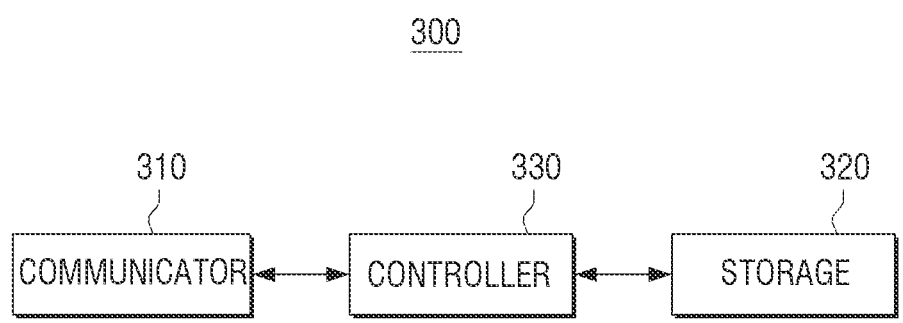
FIG. 10 is a block diagram illustrating a constitution of a server according to an embodiment of the present disclosure.

FIG. 10 is a block diagram illustrating a constitution of a server according to an embodiment of the present disclosure.

Referring to FIG. 10, the server 300 includes a communicator 310, a storage 320, and a controller 330. Meanwhile, the server 300 of FIG. 10 performs the same function as that of the user terminal device 100 in FIG. 4 and will not be further described.

The communicator 310 performs communication with the user terminal device 100' of FIG. 7. For example, the communicator 310 may perform communication with the user terminal device 100' by connecting to a network.

The communicator 310 may receive various information related with the external device 200' from the user terminal device 100'. Specifically, the communicator 310 may receive initial display information and play operation processability information regarding the external device 200'.

The storage 320 is a storing medium where various programs used for operating the server 300 are stored, and can be implemented as a memory or an HDD. For example, the storage 320 may include a ROM that stores programs for performing an operation of the controller 330 and a RAM that temporarily stores data according to performing the operation of the controller 330. Further, it may include an EEPROM to store various reference data.

Specifically, the storage 320 may store various types of contents. Moreover, the storage 320 may store various video contents, such as broadcasting contents, Internet contents, VoD contents, and the like.

The controller 330 controls a general operation of the server 300. Specifically, the controller 330 may control the communicator 310 to stream stored contents in the storage 320 to the user terminal device 100' when a contents playing command is received from the user terminal device 100'. The user terminal device 100' may play streamed contents in real time.

Meanwhile, when information to initially display contents in the external device 200' of FIG. 7 is received from the user terminal device 100', the controller 330 may convert the certain portion of contents into the first format and transmit the converted portion of contents to the user terminal device 100' through the communicator 130. Herein, initial display information may include a certain duration of contents that the external device 200' will initially buffer and time consumed for initial buffering approved in the external device 200'.

Thus, the controller 330 converts the certain portion of contents into the first format based on a certain duration of contents that the external device 200' will initially buffer and time consumed for initial buffering approved in the external device 200'. Herein, the certain portion of contents may include a certain duration of contents which is requested for initial buffering in the external device 200'.

Specifically, the controller 330 may calculate bit rates corresponding to the first format based on a certain duration of contents that the external device 200' will initially buffer and time consumed for initial buffering approved in the external device 200', and convert the certain portion of contents to have the calculated bit rates.

More specifically, the controller 330 may calculate bit rates corresponding to the first format by using Equation (2).

$$\text{Bit rates} = (\text{buffering approving time} * \text{network bandwidth}) / \text{buffering requesting time} \quad \text{Equation (2)}$$

Herein, buffering approving time is a certain duration of contents that the external device will initially buffer, buffering requesting time is time consumed for initial buffering approved in the external device, and network bandwidth is maximum transmission speed between the user terminal device 100' and the external device 200'.

The controller 330 calculates maximum bit rates of contents that can satisfy buffering performance of the external device 200' through network bandwidth that connects the user terminal device 100' and the external device 200'. Specifically, the controller 330 may calculate bit rates of contents so that certain duration of contents which the external device 200' will buffer can be transmitted during time consumed for buffering approved in the external device 200' through network bandwidth between the user terminal device 100' and the external device 200'.

Meanwhile, the controller 330 may convert the certain portion of contents into the first format by modifying at least one of a resolution, compression rates, or frame rates regarding contents.

The controller 330 determines whether to convert and transmit contents to the user terminal device 100' by comparing original bit rates of contents with the calculated bit rates. Specifically, the controller 330 controls the communicator 310 to stream original contents to the user terminal device 100' without converting bit rates, when the calculated bit rates are greater than bit rates of original contents.

However, when the calculated bit rates are smaller than bit rates of original contents, the controller 330 controls the communicator 310 to encode contents to include the calculated bit rates and stream to the user terminal device 100'. The controller 330 controls the communicator 310 to decrease bit rates of contents to be the calculated bit rates by modifying at least one of a resolution, compression rates, or frame rates regarding contents, and transmit the contents in which bit rates decrease to the user terminal device 100'.

Specifically, the controller 330 may scale down contents so as to include resolution corresponding to the calculated bit rates and generate low-quality of contents in which bit rates decrease compared to original contents.

In this case, the controller 330 may generate low-quality of contents by considering resolution of contents that can be processed in the external device 200'.

Specifically, when resolution corresponding to the calculated bit rates is lower than that of contents that can be processed in the external device 200', the controller 330 scales down contents to the resolution corresponding to the calculated bit rates.

However, when resolution of contents that can be processed in the external device 200' is lower than resolution corresponding to the calculated bit rates, the controller 330 scales down contents to the resolution that can be processed in the external device 200'. Through this operation, the external device 200' can immediately play the streamed contents from the server 300 through the user terminal device 100' without a separate scaling while satisfying an initial buffering operation.

Further, the controller 330 may generate low-quality of contents in which bit rates decrease by increasing compression rates to be compression rates corresponding to the calculated bit rates and re-encoding contents. Furthermore, the controller 330 may generate low-quality of contents in which bit rates decrease compared to original contents by decreasing frame rates to be frame rates corresponding to the calculated bit rates and re-encoding contents.

Meanwhile, when transmitting contents to the user terminal device 100', the controller 330 may control the communicator 310 to also transmit additional information regarding contents. Herein, additional information regarding contents may include title, cast, and plot.

Meanwhile, the controller 330 controls converting contents into the second format different from the first format and transmitting the converted content to the user terminal device 100' through the communicator 310 after transmitting the portion converted into the first format to the user terminal device 100'. Thus, when every certain duration of contents, which is requested for initial buffering in the external device 200', is transmitted to the user terminal device 100', the controller 330 may control re-converting bit rates of contents and transmitting the converted content to the user terminal device 100'. Accordingly, the user terminal device 100' may transmit contents in which the bit rates received from the server 300 are re-converted to the external device 200'.

For the above transmission, the controller 330 may determine that buffering completes in the external device 200', if every contents capacity used for initial buffering in the external device 200' is transmitted. Thus, when every certain duration of contents that the external device 200' will buffer is transmitted to the user terminal device 100', the controller 330 may determine that initial buffering completes in the external device 200'. Meanwhile, when a buffering completion message of the external device 200' is received from the user terminal device 100', the controller 330 may determine that buffering completes in the external device 200'.

Herein, contents converted into the second format may have higher bit rates than those of the certain portion in contents converted into the first format. When initial buffering operation completes in the external device 200', the controller 330 converts contents into higher bit rates than those of contents transmitted for initial buffering, and streams to the user terminal device 100'. Further, the user terminal device 100' may receive contents converted into the second format from the server 300 and deliver the converted content to the external device 200'.

Meanwhile, the external device 200' may buffer contents received thereafter during time for playing the initially buffered contents, signal-process and play the contents buffered thereafter when playing the initially buffered contents completes. Therefore, even if the server 300 streams contents converted into relatively higher bit rates after initial buffering completes to the external device 200' through the user terminal device 100', the external device 200' may play contents in real time.

Specifically, when it is determined that contents used for initial buffering is transmitted from the external device, the controller 330 may stop transmitting contents in the first format, convert contents into the second format, and transmit the converted contents to the external device 200' through the user terminal device 100'.

In this case, the controller 330 may control the communicator 310 to transmit contents in the second format including the same bit rates as in original contents to the user terminal device 100', or transmit contents in the second format including lower bit rates than those of original contents to the user terminal device 100'.

Herein, the reason why contents is converted to include lower bit rates than those of original contents is that play operation processability of the external device 200' is considered.

Play operation processability indicates an operation that signal-processes and plays contents in the external device 200'. Specifically, play operation processability may include at least one of a resolution that the external device 200' can process, decoder performance, or codec type which are formed in the external device 200'. Further, play operation processability may include a network fee for transmitting data from the user terminal device 100' to the external device 200'.

Such play operation processability may be stored in the server 300 in advance or received from the user terminal device 100'. For example, the server 300 may match play operation processability of each external device and store them in advance. Meanwhile, the server 300 may receive play operation processability of the external device 200' from the user terminal device 100'. Specifically, the controller 330 may request transmission of play operation processability to the user terminal device 100' through the communicator 310, and receive play operation processability of the external device 200' from the user terminal device 100'. When requesting transmission of initial display information to the user terminal device 100', the controller 330 may also request transmission of play operation processability.

Specifically, the controller 330 determines whether the external device 200' can signal-process and play original contents according to resolution that can be processed in the external device 200', decoder performance, and codec type.

In this case, when it is determined that the external device 200' can signal-process and play original contents, the controller 330 may stream original contents to the user terminal device 100'.

However, when the external device 200' cannot perform signal-processing original contents, the controller 330 may convert contents into lower bit rates than those of original contents and stream to the user terminal device 100'. For example, the controller 330 may re-encode contents to include bit rates that can be signal-processed in the external device 200' according to resolution that can be processed in the external device 200', decoder performance and codec type which are formed on the external device, convert contents into lower bit rates than those of original contents, and stream the converted contents to the user terminal device 100'.

Further, if the cost exceeds a certain fee when the user terminal device 100' transmits contents with original bit rates to the external device 200', the controller 330 may convert contents into lower bit rates than those of original contents and stream to the user terminal device 100'.

However, in the above embodiment, the bit rates of contents converted by considering play operation processability may be higher than bit rates of contents which is streamed for initial buffering.

Meanwhile, the controller 330 may convert a remaining portion excluding the certain portion of contents into the second format, or an entire portion including the certain portion of contents into the second format. Thus, when initial buffering operation completes in the external device 200', the controller 330 may convert the remaining portion after duration of contents transmission for initial buffering into the second format and stream to the user terminal device 100', or convert the entire portion of contents from the start into the second format again and stream to the user terminal device 100'.

Meanwhile, the above embodiment describes that, when initial buffering completes in the external device 200', high-quality of contents better than contents transmitted during initial buffering is transmitted to the user terminal device 100', However, this is merely one embodiment and time point when transmitting high-quality of contents in the server 300 can be varied.

For example, even before initial buffering completes in the external device 200', the controller 330 may stop streaming contents converted into lower bit rates when there is a request of the user terminal device 100', and stream contents converted into relatively higher bit rates to the user terminal device 100'.

Meanwhile, even when initial display information of the external device 200' or network situation is modified, the controller 330 may stop streaming contents converted into lower bit rates. Specifically, when duration that the external device 200' will buffer decreases or network bandwidth between the user terminal device 100' and the external device 200' expands while streaming contents converted into lower bit rates for initial buffering of the external device 200', the controller 330 may stop streaming contents converted into lower bit rates, and stream contents converted into relatively higher bit rates to the user terminal device 100'. Therefore, the user terminal device 100' may deliver the contents received from the server 300 to the external device 200'.

In summary, according to the embodiment, the server 300 streams contents converted into lower bit rates to the external device 200' through the user terminal device 100' until initial buffering completes in the external device 200'. Therefore, it may save time consumed for initial buffering performed when playing contents in the external device 200'.

Figure 11:
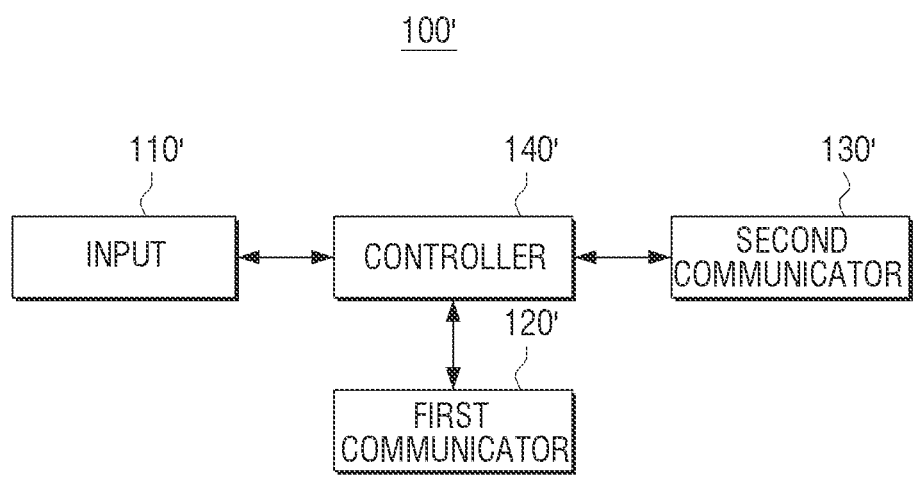
FIG. 11 is a block diagram illustrating a constitution of a user terminal device according to an embodiment of the present disclosure.

FIG. 11 is a block diagram illustrating a constitution of a user terminal device according to an embodiment of the present disclosure.

Referring to FIG. 11, the user terminal device 100' includes an input 110', a first communicator 120', a second communicator 130', and a controller 140'. The user terminal device 100' of FIG. 11 performs a role of transmitting contents which is transmitted from the server to the external device without converting bit rates of contents. Thus, the user terminal device 100' of FIG. 11 has a difference in that separate units to perform communication with the server are further included compared with the user terminal device 100 of FIG. 4.

The input 110' is inputting means which receives various user manipulation and delivers to the controller 140', and may be implemented as an inputting panel. Herein, the inputting panel may be constituted with a touch pad, a keypad provided with various function keys, number keys, special keys, and character keys, a touch screen, or the like.

Specifically, the input 110' receives a user command which transmits contents to the external device 200'. Herein, contents may be video contents provided form the user terminal device 100'. Furthermore, the input 110' may receive a user command to select an external device which performs communication with the user terminal device 100'.

The first communicator 120' performs communication with the server, and the second communicator 130' performs communication with the external device. For communication, the first communicator 120' and the second communicator 130' may include various communication modules, such as a nearfield wireless communication module (not illustrated) and a wireless communication module (not illustrated). Herein, the nearfield wireless communication module performs communication with an external device placed within near distance according to nearfield wireless communication methods, such as BT and ZigBee. Further, the wireless communication module performs communication by connecting to an external network according to wireless communication protocols, such as WiFi and IEEE. Moreover, the wireless communication module may further include a mobile communication module which performs communication by connecting to a mobile communication network according to various mobile communication standards, such as 3G, 3GPP, and LTE.

The controller 140' controls a general operation of the user terminal device 100'. Specifically, when a command to transmit contents is inputted, the controller 140' may control the second communicator 130' to search for surrounding external devices that can perform a wireless communication, and perform communication with the selected external device by a user.

Further, the controller 140' may control the first communicator 120' to transmit information to initially display contents in the external device 200' and information regarding network situation connected with the external device 200' to the server 300. Additionally, the controller 140' may control the first communicator 120' to transmit information regarding contents play operation processability of the external device 200' to the server 300.

Herein, initial display information and contents play operation processability information may be stored in the user terminal device 100' in advance or received from the external device 200'. Specifically, the above information may be matched and stored per external device in advance, or may be received from the external device 200' by requesting transmission of the above information to the external device 200'.

Meanwhile, the controller 140' receives the certain portion of contents converted into the first format from the server 300 based on information to initially display contents in the external device 200', and transmits to the external device 200'. When initial buffering operation completes in the external device 200', the controller 140' may receive contents converted into the second format from the server 300 and transmit the converted contents to the external device 200'. Thus, the controller 140' may control receiving contents transmitted from the server 300 and streaming to the external device 200'.

Herein, contents converted into the second format may include higher bit rates than the certain portion of contents converted into the first format.

Specifically, before initial buffering completes in the external device 200', the controller 140' receives contents converted into corresponding bit rates to initial display information from the server 300 and streams to the external device 200'. Further, after initial buffering completes in the external device 200', the controller 140' may control receiving contents converted into corresponding bit rates to play operation processability of the external device 200' from the server 300, and streaming to the external device 200'.

Meanwhile, the user terminal device 100' may further include at least one of the signal processor (not illustrated), the output (not illustrated), or the storage (not illustrated) as well as the units illustrated in FIG. 11. However, the above units should not necessarily be included and the units may be added according to product type of the user terminal device 100'.

The signal processor performs signal processing regarding contents so as to output contents through the output. Specifically, the signal processor may perform operations, such as decoding, scaling, frame rate converting, and encoding, regarding video signals included in contents, and convert them to video signals that can be outputted in the output. Further, the signal processor may perform signal-processing, such as decoding, regarding audio signals included in contents, and convert them to audio signals that can be outputted in the output.

The output performs a function of outputting contents. For the outputting, the output may include the display (not illustrated) and the speaker (not illustrated).

Specifically, the display may display video signals as video. For the displaying, the display may be implemented as an LCD, an OLED, a PDP, or the like.

Further, the display may provide various display screens that can be provided through the user terminal device 100'. Specially, the display may display a list regarding external devices that can perform a wireless communication with the user terminal device 100', a list regarding contents stored in the user terminal device 100' in advance, and objects (e.g., an icon) to receive a contents transmitting command.

Herein, a touch screen format which display units form an interlayer structure with the touch pad may be implemented, and the touch screen may be constituted to examine a touch inputting position, a touch inputting size, and a touch inputting pressure.

Meanwhile, the speaker (not illustrated) may process and output audio signals as audio. Specifically, the speaker (not illustrated) may amplify audio signals delivered from the signal processor and provide the amplified audio signals to a user.

Although the above embodiment describes that audio is outputted through the speaker (not illustrated), an outputting port, such as a jack, can be provided. Meanwhile, the display (not illustrated) and the speaker (not illustrated) may synchronize audio signals and video signals which constitute contents according to controlling of the controller 140'.

Meanwhile, the controller 140' may perform signal-processing and playing regarding contents streamed from the server 300. When a contents transmitting command is inputted while playing contents, the controller 140' may control stopping of playing contents, receiving a portion that will be played thereafter from the server 300, and streaming to the external device 200'. Thus, the controller 140' may seamlessly control playing contents which was played in the user terminal device 100' in the external device 200'. However, the controller 140' may control streaming a portion of contents which will be played thereafter to the external device without stopping playing contents.

In this case, the controller 140' may receive contents including the converted bit rates from the server 300 and deliver the converted content to the external device 200' based on initial display information and play operation processability of the external device 200'.

The storage (not illustrated) is a storing medium where various programs used for operating the user terminal device 100' are stored, and can be implemented as a memory or an HDD. For example, the storage may include a ROM that stores programs for performing an operation of the controller 140' and a RAM that temporarily stores data according to performing the operation of the controller 140'. Further, it may include an EEPROM to store various reference data.

Specifically, the storage may store initial display information and play operation processability information regarding the external device 200'. The storage may store device names of external devices, and initial display information and play operation processability information per device name. Further, when initial display information and play operation processability information are received from a new external device, the storage may additionally store new information.

Therefore, when an external device to perform a wireless communication is selected from a list of the display, the controller 140' may control reading initial display information and play operation processability matched with the selected external device from the storage and transmitting the read information to the server 300.

Meanwhile, regarding the external device 200' illustrated in FIG. 7, it performs the same operation as that of the external device 200 illustrated in FIG. 1 and the external device 200' may include the same units as in FIG. 6.

Figure 12:
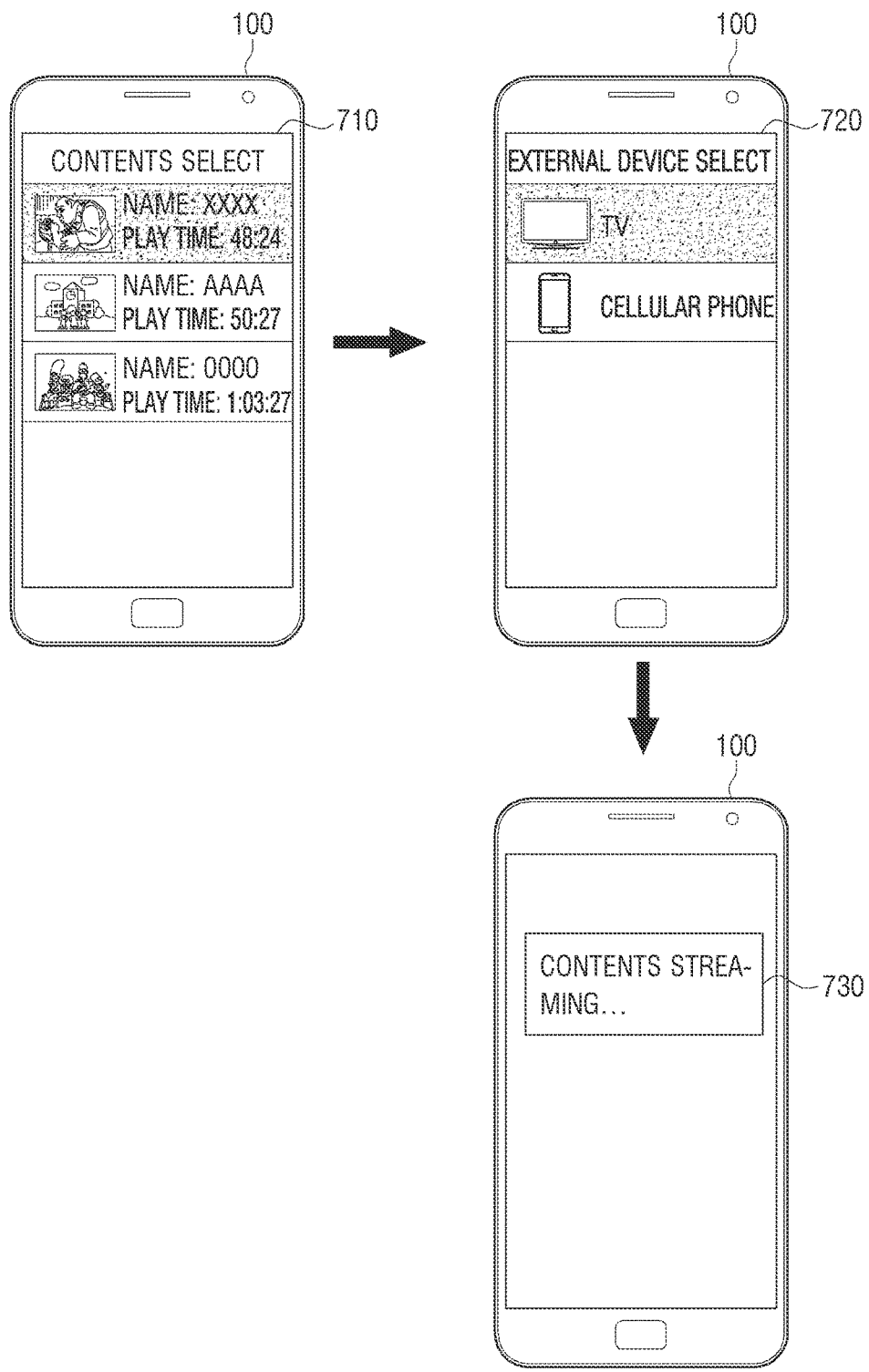
FIGS. 12 and 13 illustrate a contents streaming method according to an embodiment of the present disclosure.
Figure 13:
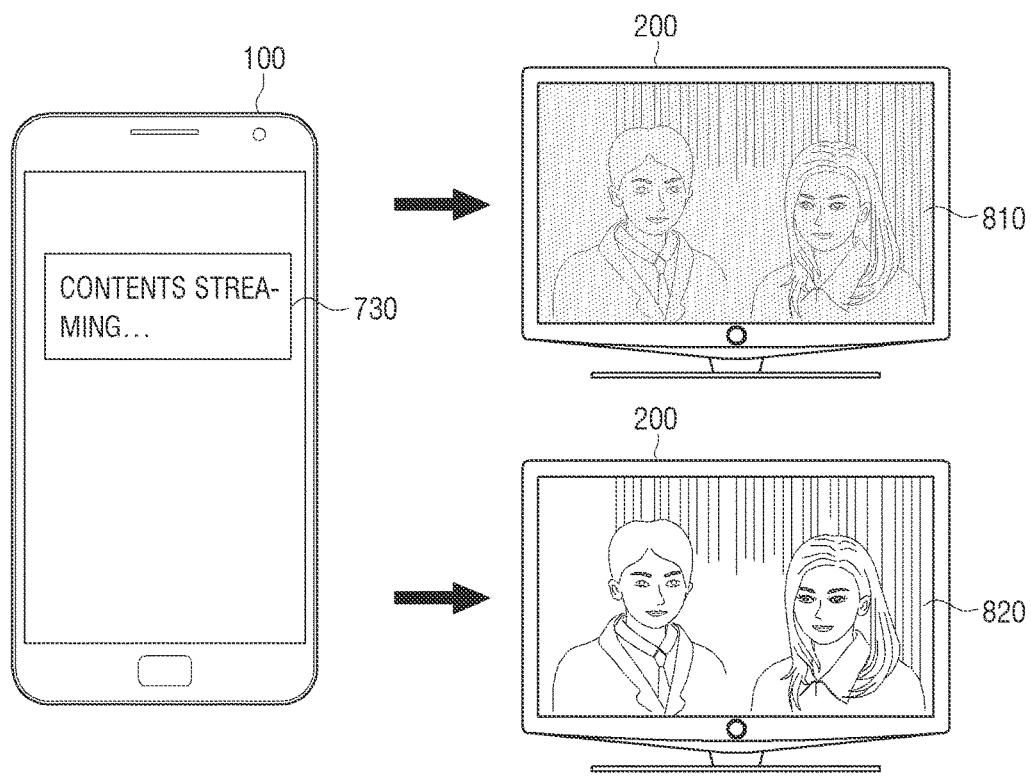

FIGS. 12 and 13 illustrate a contents streaming method according to an embodiment of the present disclosure.

Referring to FIGS. 12 and 13, when an icon is selected to receive a command to share contents displayed on the screen of the user terminal device 100, the user terminal device 100 displays a list 710 regarding stored contents. Herein, the list 710 of contents may include names regarding stored contents in the user terminal device 100 and playing time.

When one contents is selected from the list 710, the user terminal device 100 searches for surrounding external devices that can perform a wireless communication and displays a list 720 of the searched external devices on the screen. For example, referring to FIG. 12, names and icons of the searched surrounding external devices may be displayed.

When one external device is selected from the list 720, the user terminal device 100 connects communication with the selected external device, and streams the selected contents to the external device. In this case, the user terminal device 100 may display a Graphical User Interface (GUI) 730 indicating that contents is streaming on the screen.

Meanwhile, the above embodiment describes that contents to be streamed is selected first. However, this is merely one embodiment. According to a user command, a list to perform a wireless communication may be displayed first, and contents to be streamed may be selected next when connecting communication with specific external device.

The user terminal device 100 may convert bit rates of contents and transmit the contents in which bit rates are converted to the external device 200 according to whether initial buffering completes in the external device 200. Specifically, until initial buffering completes in the external device 200, the user terminal device 100 may convert contents into corresponding bit rates to initial display information, and transmit the contents in which bit rates are converted to the external device 200. Further, after initial buffering completes in the external device 200, the user terminal device 100 may re-convert contents into corresponding bit rates to play operation processability, and transmit the contents including the converted bit rates to the external device 200.

Therefore, as illustrated in FIG. 13, low-quality contents 810 is played on the external device 200 before initial buffering completes, and high-quality of contents 820 is played after initial buffering completes.

Figure 14:
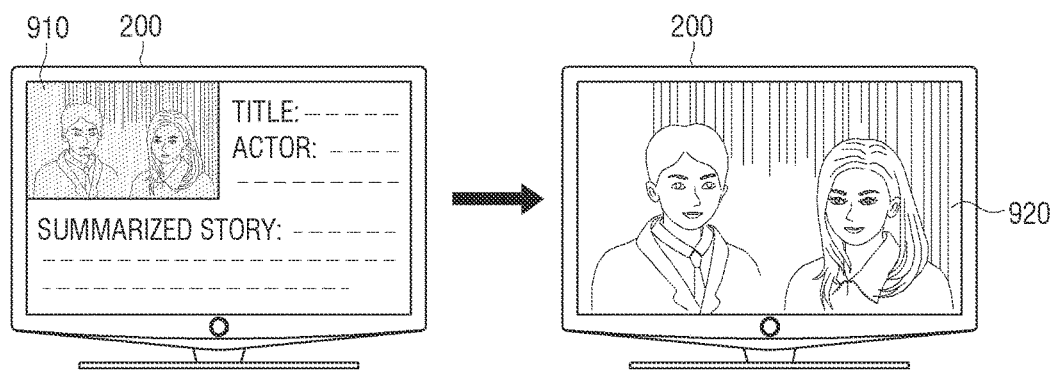
FIG. 14 illustrates method for playing contents in an external device according to an embodiment of the present disclosure.

FIG. 14 illustrates a method for playing contents in an external device according to an embodiment of the present disclosure.

Referring to FIG. 14, the external device 200 may receive low-quality of contents in which bit rates are converted into relatively lower bit rates from the user terminal device 100. When the user terminal device 100 receives low-quality of contents by decreasing resolution of contents, the external device 200 may play contents on one area of the screen provided on the display, and display additional information regarding the contents on another area. Herein, additional information regarding the contents may include a title, a cast, a plot, and the like. Thus, when resolution of contents is lower than resolution that can be played in the display of the external device 200, the external device 200 may play contents and display additional information regarding the contents on a remaining area of the screen, which is extra area after playing contents.

Meanwhile, after initial buffering completes, the user terminal device 100 may transmit contents in which bit rates are converted into relatively higher bit rates by increasing resolution of contents to the external device 200 compared to performing initial buffering operation. In this case, the external device 200 may play the received contents in a full view format on the screen provided by the display.

For example, as illustrated in FIG. 14, the external device 200 may play contents 910 on one area of the screen when performing initial buffering operation, and a title, a cast, and a plot of the contents on another area. Further, after initial buffering operation completes, the external device 200 may play contents 920 in a full view format on the screen.

Figure 15:
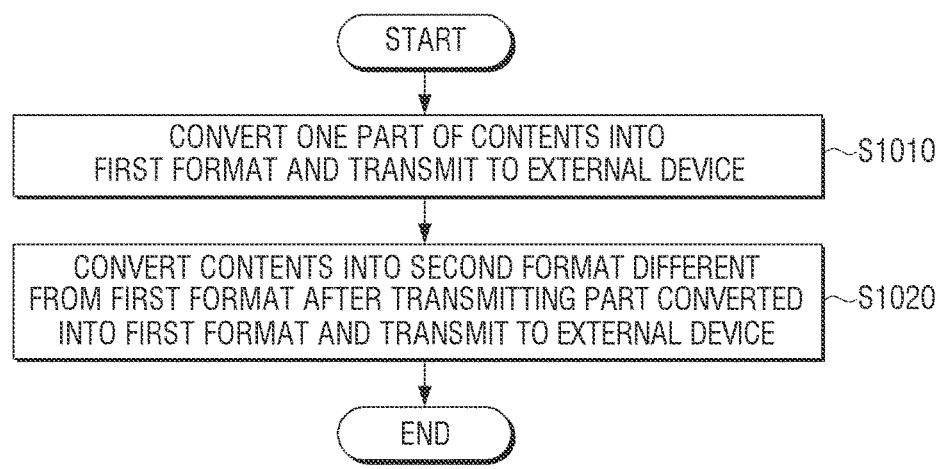
FIG. 15 is a flowchart illustrating a contents streaming method of a user terminal device according to an embodiment of the present disclosure.

FIG. 15 is a flowchart illustrating a contents streaming method of a user terminal device according to an embodiment of the present disclosure.

Referring to FIG. 15, a certain portion of contents is converted into the first format and transmitted to the external device based on information to initially display contents in the external device at operation S1010.

For the above operation, when a user command to stream contents to the external device is inputted, information to initially display contents in the external device may be obtained. Herein, initial display information may include a certain duration of contents that the external device will initially buffer and time consumed for initial buffering approved in the external device, and may be stored in the user terminal device in advance or received from the external device.

Meanwhile, the certain portion of contents is converted into the first format based on a certain duration of contents that the external device will buffer and time consumed for initial buffering approved by the external device. Herein, the certain portion of contents may include a certain duration of contents requested for initial buffering in the external device.

Specifically, bit rates corresponding to the first format may be calculated and the certain portion of contents may be converted to include the calculated bit rates based on a certain duration of contents that the external device will initially buffer and time consumed for initial buffering approved in the external device.

More specifically, bit rates corresponding to the first format may be calculated by using Equation (3).

Bit rates=(buffering approving time*network bandwidth)/buffering requesting time    Equation (3)

Herein, buffering approving time is a certain duration of contents that the external device will initially buffer, buffering requesting time is time consumed for initial buffering approved in the external device, and network bandwidth is maximum transmission speed between the user terminal device and the external device.

Meanwhile, when the calculated bit rates are lower than those of original bit rates, bit rates may be converted and transmitted through various methods. Specifically, at least one of a resolution, compression rates, or frame rates regarding contents may be modified to convert the certain portion of contents into the first format. Further, bit rates of contents may decrease to include the calculated bit rates, the contents in which bit rates decrease may be transmitted to the external device.

After transmitting the converted portion into the first format to the external device, contents is converted into the second format different from the first format and transmitted to the external device at operation S1020.

Thus, when it is determined to transmit contents enough for buffering in the external device, transmitting contents in the first format may stop and the contents converted into the second format may be transmitted to the external device.

Thus, contents may be converted into the second format. In this case, another portion than the contents converted into the first format may be converted into the second format, or an entire portion of contents including the contents converted into the first format may be converted into the second format.

Herein, the contents converted into the second format may include higher bit rates than the certain portion of contents which is converted into the first format.

However, play operation processability of the external device may be considered. In other words, while contents is converted to include higher bit rates than bit rates of contents streamed for initial buffering, the contents in the second format including the same bit rates as those of original contents may be transmitted to the external device, or the contents in the second format including lower bit rates than those of original contents may be transmitted to the external device by considering play operation processability of the external device.

Figure 16:
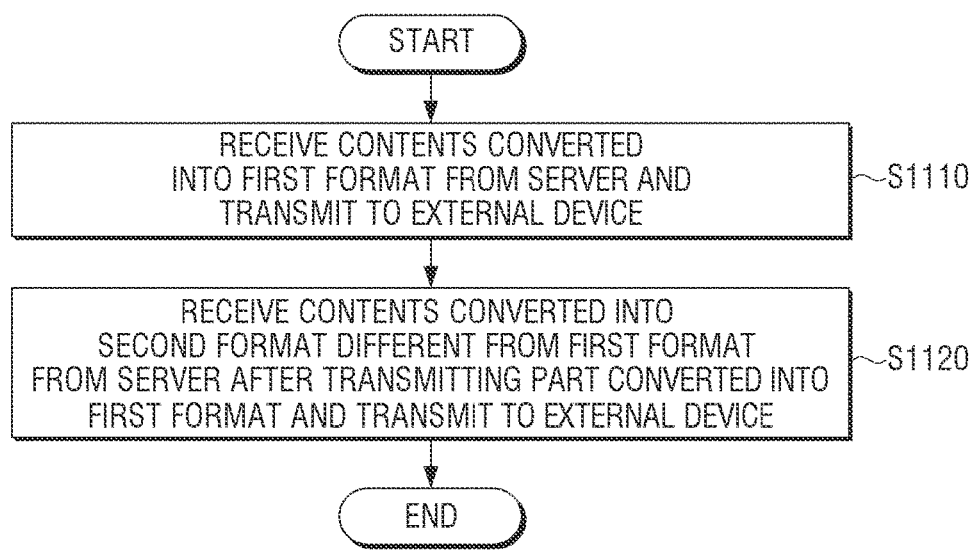
FIG. 16 is a flowchart illustrating a contents airing method of a user terminal device according to an embodiment of the present disclosure.

FIG. 16 is a flowchart illustrating a contents airing method of a user terminal device according to an embodiment of the present disclosure.

Referring to FIG. 16, at operation S1110, the contents converted into the first format is received from the server and transmitted to the external device.

In this case, the server may convert the certain portion of contents into the first format and transmit the converted portion of contents to the user terminal device based on information to initially display contents in the external device.

For the above operation, the server may obtain information to initially display contents in the external device. For example, the server may store initial display information in advance or receive initial display information from the user terminal device.

Specifically, the server may calculate bit rates corresponding to the first format and convert the certain portion of contents into the calculated bit rates based on a certain duration of contents that the external device will initially buffer and time consumed for initial buffering approved in the external device.

More specifically, the server may calculate bit rates corresponding to the first format by using Equation (4).

Bit rates=(buffering approving time*network bandwidth)/buffering requesting time    Equation (4)

Herein, buffering approving time is a certain duration of contents that the external device will initially buffer, buffering requesting time is time consumed for initial buffering approved in the external device, and network bandwidth is maximum transmission speed between the user terminal device and the external device.

Meanwhile, when the calculated bit rates are lower than original bit rates, the server may convert bit rates through various methods and transmit the contents in which bit rates are converted to the user terminal device. Specifically, at least one of a resolution, compression rates, or frame rates regarding contents may be modified to decrease bit rates of contents to be the calculated bit rates, and the contents including the decreased bit rates may be transmitted to the user terminal device.

Meanwhile, after transmitting the portion converted into the first format, the contents converted into the second format different from the first format may be received from the server and transmitted to the external device at operation S1120. Herein, the contents converted into the second format may include higher bit rates than the certain portion of contents converted into the first format.

Specifically, when buffering completes in the external device, the server may stop transmitting the contents in the first format and transmit the contents in the second format including the same bit rates as those of original contents, or transmit the contents in the second format including lower bit rates than those of original contents to the external device. Herein, the reason why the server converts contents into lower bit rates is that play operation processability of the external device is considered.

Meanwhile, the server may convert a remaining portion excluding the certain portion of contents into the second format, or an entire portion of contents including the certain portion of contents into the second format, and transmit the converted portion of contents to the user terminal device.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, CD-ROMs, magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Further, although the block diagrams describing the display apparatus do not illustrate a bus, communication between the units in the display apparatus may be performed through the bus. Further, the display apparatus may include processors, such as a Central Processing Unit (CPU) and a microprocessor which implement the above various operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A controlling method of a user terminal device which streams a content to an external device, the method comprising: receiving initial display information from the external device, wherein the initial display information includes information on the content of a predetermined time amount to be initially buffered by the external device and information on a required time for the external device to buffer the content of the predetermined time amount; converting, by a processor, a part of the content into a predetermined format for the external device buffering the content of the predetermined time amount within the required time based on the initial display information; transmitting, through a communicator, the format-converted content to the external device; and transmitting, through the communicator, a remaining portion of the content excluding the format-converted content to the external device, wherein a bit rate of the remaining portion of the content is higher than a bit rate of the format-converted content, wherein the converting of the part of the content into the predetermined format comprises: calculating bit rates corresponding to the predetermined format based on the time amount of the content for the external device to perform initial buffering and the time required for initial buffering allowed by the external device included in the initial display information; and converting the part of the content so as to have the calculated bit rates, wherein the calculating of bit rates comprises calculating the bit rates corresponding to the predetermined format with the following equation: Bit rates=(buffering approving time*network bandwidth)/buffering requesting time, and wherein the buffering approving time comprises the time amount of the content for the external device to perform initial buffering, the buffering requesting time comprises the time required for initial buffering allowed by the external device included in the initial display information, and the network bandwidth comprises a maximum transmission speed between the user terminal device and the external device.

2. The method of claim 1, wherein the converting of the part of the content into the predetermined format comprises modifying at least one of a resolution, compression rates, or frame rates regarding the content.

3. The method of claim 1, wherein the part of the content comprises the time amount of the content used for the external device to perform initial buffering.

4. The method of claim 1, wherein the converting of the part of the content comprises converting the part of the content into a first format, and wherein the method further comprises: converting the remaining portion of the content into a second format different from the first format; and transmitting the second format-converted content to the external device after transmitting the first format-converted content.

5. The method of claim 4, wherein the converting of the content into the second format comprises converting a remaining portion of the content excluding the part of the content into the second format, or converting an entire portion of the contents including the part of the content into the second format.

6. The method of claim 5, wherein the content converted into the second format has higher bit rates than those of the part of the content converted into the first format.

7. The method of claim 5, wherein the transmitting of the content converted into the second format comprises: transmitting the content in the second format with the same bit rates as those of original content to the external device, or transmitting the content in the second format with lower bit rates than those of the original content to the external device.

8. A user terminal device which streams a content to an external device, the user terminal device comprising: a communicator; and a processor configured to: control the communicator to receive initial display information from the external device, wherein the initial display information includes information on the content of a predetermined time amount to be initially buffered by the external device and information on a required time for the external device to buffer the content of the predetermined time amount, convert a part of the content into a predetermined format for the external device buffering the content of the predetermined time amount within the required time based on the initial display information, control the communicator to transmit the format-converted content to the external device, and control the communicator to transmit a remaining portion of the content excluding the format-converted content to the external device, wherein a bit rate of the remaining portion of the content is higher than a bit rate of the format-converted content, wherein the processor is further configured to: calculate bit rates corresponding to the predetermined format based on the time amount of the content for the external device to perform initial buffering and the time required for initial buffering allowed by the external device, and convert the part of the content so as to have the calculated bit rates, wherein the processor is further configured to calculate bit rates corresponding to the predetermined format with the following equation: Bit rates=(buffering approving time*network bandwidth)/buffering requesting time, and wherein the buffering approving time comprises the time amount of the content for the external device to perform initial buffering, the buffering requesting time comprises the time required for initial buffering allowed by the external device, and the network bandwidth comprises a maximum transmission speed between the user terminal device and the external device.

9. The user terminal device of claim 8, wherein the processor is further configured to convert the part of the content into the predetermined format by modifying at least one of a resolution, compression rates, or frame rates regarding the content.

10. The user terminal device of claim 8, wherein the format of part of the content comprises converting the part of the content into a first format, and wherein the processor is further configured to: convert the remaining portion of the content into a second format different from the first format, and control the communicator to transmit the second format-converted content to the external device.

11. The user terminal device of claim 10, wherein the part of the content comprises the time amount of the content for the external device to perform initial buffering.

12. The user terminal device of claim 10, wherein the processor is further configured to: convert a remaining portion excluding the part of the content into the second format, or convert an entire portion of the content including the part of the content into the second format.

13. The user terminal device of claim 12, wherein the content converted into the second format comprises higher bit rates than the part of the content converted into the first format.

14. The user terminal device of claim 10, wherein the processor is further configured to control the communicator to: transmit content in the second format with the same bit rates as those of original content to the external device, or transmit content in the second format with lower bit rates than those of the original content to the external device.

15. A non-transitory processor readable medium for storing a computer program of instructions configured to be readable by a processor for instructing the at least one processor to execute a computer process for performing the method as recited in claim 1.

* * * * *